(12) United States Patent
Choi et al.

(10) Patent No.: US 9,723,429 B2
(45) Date of Patent: Aug. 1, 2017

(54) METHOD FOR DELIVERING NOTIFICATION MESSAGES IN M2M SYSTEM AND DEVICES FOR SAME

(71) Applicant: LG ELECTRONICS INC., Seoul (KR)

(72) Inventors: Heedong Choi, Seoul (KR); Seungkyu Park, Seoul (KR); Seongyun Kim, Seoul (KR); Hongbeom Ahn, Seoul (KR); Seungmyeong Jeong, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 14/909,651

(22) PCT Filed: Sep. 26, 2014

(86) PCT No.: PCT/KR2014/009042
§ 371 (c)(1),
(2) Date: Feb. 2, 2016

(87) PCT Pub. No.: WO2015/046961
PCT Pub. Date: Apr. 2, 2015

(65) Prior Publication Data
US 2016/0192111 A1 Jun. 30, 2016

Related U.S. Application Data

(60) Provisional application No. 61/883,194, filed on Sep. 27, 2013, provisional application No. 61/935,846, (Continued)

(51) Int. Cl.
*H04W 4/00* (2009.01)
*H04W 76/02* (2009.01)
*H04L 29/08* (2006.01)

(52) U.S. Cl.
CPC ............. *H04W 4/005* (2013.01); *H04L 67/12* (2013.01); *H04L 67/26* (2013.01); *H04W 76/022* (2013.01); *H04L 67/325* (2013.01)

(58) Field of Classification Search
CPC ... H04W 4/005; H04W 72/02; H04W 76/022; H04L 67/2842; H04L 67/26;
(Continued)

(56) References Cited

U.S. PATENT DOCUMENTS 5,696,486 A 12/1997 Poliquin et al.
2012/0106329 A1 5/2012 Ahmed et al.
(Continued)

FOREIGN PATENT DOCUMENTS

JP 2007-184754 A 7/2007
JP 2008-245102 A 10/2008
(Continued)

OTHER PUBLICATIONS

Azzarà et al., "Architecture, Functional Requirements, and Early Implementation of an Instrumentation Grid for the IoT," IEEE 14th International Conference on High Performance Computing and Communications, Jun. 25-27, 2012, pp. 320-327 (9 pages).
(Continued)

*Primary Examiner* — Sujatha Sharma
(74) *Attorney, Agent, or Firm* — Birch, Stewart, Kolasch & Birch, LLP

(57) ABSTRACT

The present invention relates to a method for processing notification messages in a machine-to-machine (M2M) system and devices for same, the method comprising the steps of: processing by an M2M device one or more notification messages; and transmitting the processed notification message(s), wherein: the one or more notification messages are generated as an originator device detects a change in the resources to subscribe to comprising, as a child resource, a
(Continued)

subscription resource configured in the originator device; the one or more notification messages comprise implementation information configured based on the policy information configured in the originator device for the processing of the one or more notification messages; the one or more notification messages are processed based on the implementation information; the one or more processed notification messages are transmitted comprising the implementation information; and the subscription resource and the resources to subscribe to exhibit a data structure uniquely addressable by using a unique address.

18 Claims, 17 Drawing Sheets

Related U.S. Application Data filed on Feb. 5, 2014, provisional application No. 61/937,621, filed on Feb. 10, 2014, provisional application No. 61/950,230, filed on Mar. 10, 2014, provisional application No. 61/952,851, filed on Mar. 13, 2014, provisional application No. 61/989,536, filed on May 7, 2014, provisional application No. 62/011,036, filed on Jun. 12, 2014, provisional application No. 62/023,886, filed on Jul. 13, 2014, provisional application No. 62/025,022, filed on Jul. 16, 2014.

(58) Field of Classification Search
CPC ... H04L 41/042; H04L 41/0681; H04L 67/06; G06F 17/30067; G06F 3/002
See application file for complete search history.

(56) References Cited

U.S. PATENT DOCUMENTS

| | | | |
|---|---|---|---|
| 2012/0170451 A1* | 7/2012 | Viswanathan | H04W 4/005 370/230 |
| 2013/0066965 A1 | 3/2013 | Foti | |
| 2013/0336278 A1 | 12/2013 | Kim et al. | |
| 2014/0064232 A1 | 3/2014 | Chang et al. | |
| 2014/0304616 A1* | 10/2014 | Park | H04L 51/24 715/752 |
| 2015/0373528 A1* | 12/2015 | Iwai | H04W 24/02 455/419 |
| 2016/0007138 A1* | 1/2016 | Palanisamy | H04W 4/005 455/41.2 |
| 2016/0007166 A1* | 1/2016 | Iwai | H04W 4/06 370/312 |

FOREIGN PATENT DOCUMENTS

| | | |
|---|---|---|
| KR | 10-2011-0038333 A | 4/2011 |
| KR | 10-2012-0127050 A | 11/2012 |
| WO | WO 2012/068465 A1 | 5/2012 |
| WO | WO 2012/121552 A2 | 9/2012 |
| WO | WO 2012/150778 A2 | 11/2012 |
| WO | WO 2013/142139 A2 | 9/2013 |

OTHER PUBLICATIONS

U.S. Appl. No. 14/909,633, filed Feb. 2, 2016.
"Machine-to-Machine Communications (M2M); Functional Architecture," ETSI TS 102 690, V1.1.1, Oct. 2011, pp. 1-280.

* cited by examiner

FIG. 18
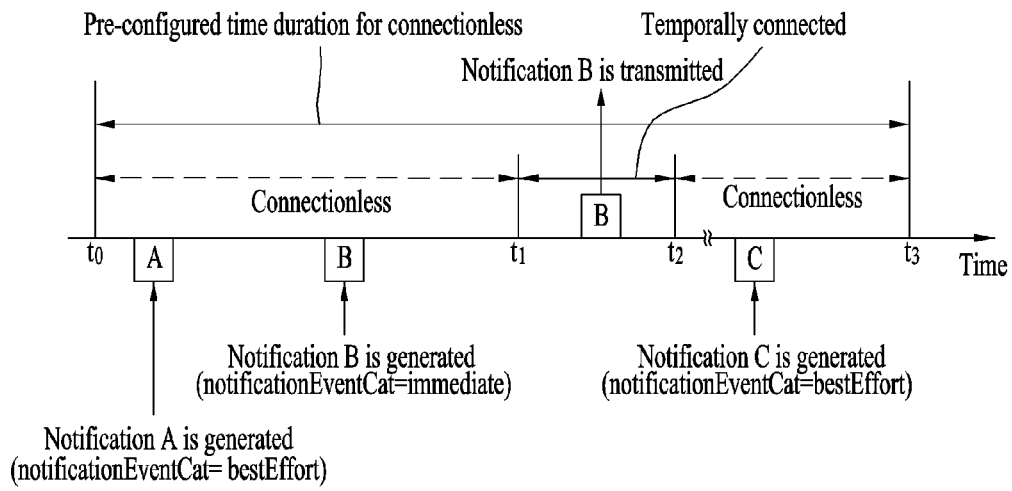
FIG. 19
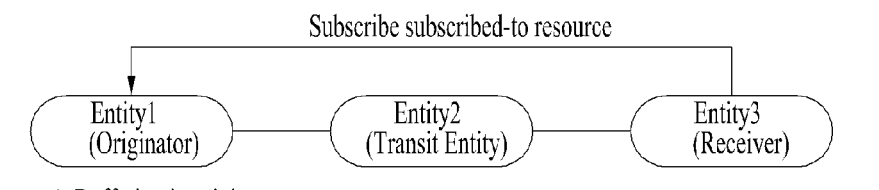
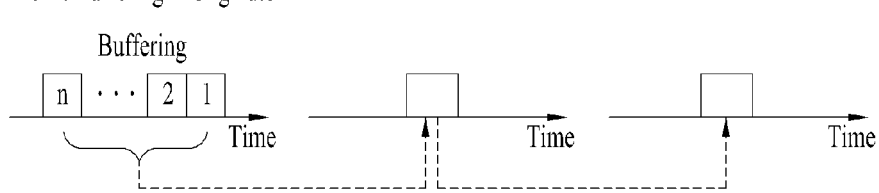
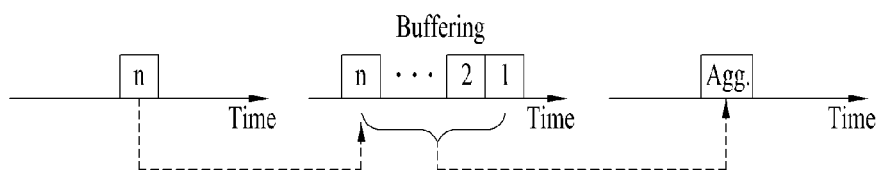

US 9,723,429 B2

METHOD FOR DELIVERING NOTIFICATION MESSAGES IN M2M SYSTEM AND DEVICES FOR SAME

CROSS REFERENCE TO RELATED APPLICATIONS

This application is the National Phase of PCT International Application No. PCT/KR2014/009042, filed on Sep. 26, 2014, which claims priority under 35 U.S.C. 119(e) to U.S. Provisional Application No. 61/883,194, filed on Sep. 27, 2013, U.S. Provisional Application No. 61/935,846, filed on Feb. 5, 2014, U.S. Provisional Application No. 61/937,621, filed on Feb. 10, 2014, U.S. Provisional Application No. 61/950,230, filed on Mar. 10, 2014, U.S. Provisional Application No. 61/952,851, filed on Mar. 13, 2014, U.S. Provisional Application No. 61/989,536, filed on May 7, 2014, U.S. Provisional Application No. 62/011,036, filed on Jun. 12, 2014, U.S. Provisional Application No. 62/023,886, filed on Jul. 13, 2014, U.S. Provisional Application No. 62/025,022, filed on Jul. 16, 2014, all of which are hereby expressly incorporated by reference into the present application.

TECHNICAL FIELD

The present invention pertains to a Machine-to-Machine (M2M) communication system. More specifically, the present invention pertains to a method and apparatus for subscribing a specific resource and notifying in a M2M system.

BACKGROUND ART

Recently, interest in M2M (machine-to-machine) communication is rising. The M2M communication corresponds to communication performed between machines without a human involvement. The M2M communication is also referred to as MTC (machine type communication) or IoT (internet of things) communication. A terminal used for the M2M communication is referred to as a M2M device. In general, the M2M device has characteristics such as low mobility, time tolerant or delay tolerant, small data transmission and the like. The M2M device is used in a manner of being connected with a M2M server, which stores and manages M2M communication information at the center. If a M2M device is connected according to a communication scheme different from each other, the M2M device and the M2M server are connected with each other via a M2M gateway in a section where a communication scheme is changed. In doing so, a whole M2M system may be constructed. Such a service as object tracking, power metering, automatic payment system, healthcare service, remote controlling, and the like may be provided by the M2M system.

The present invention relates to a M2M system.

DISCLOSURE

Technical Problem

An object of the present invention is to provide a method and apparatus for effectively transmitting and receiving a signal in a machine-to-machine (M2M) system.

Another object of the present invention is to provide a method and apparatus for transmitting and receiving a notification message in an environment in which a connection state between entities is not ensured in a M2M system.

Still another object of the present invention is to provide a method and apparatus for enhancing data transmission efficiency and overall system performance by not transmitting an unnecessary notification message in a M2M system.

Still another object of the present invention is to provide a method and apparatus for preferentially transmitting an important message by a user by setting priority of a notification message in a M2M system.

Still another object of the present invention is to provide a method and apparatus for efficiently transmitting a notification message in consideration of an entity forwarding the notification message in a M2M system.

Still another object of the present invention is to provide a method and apparatus for dynamically reconfiguring a notification message by a transit entity that forwards the notification message in a M2M system.

It is to be understood that both the foregoing general description and the following detailed description of the present invention are exemplary and explanatory and are intended to provide further explanation of the invention as claimed.

Technical Solution

In an aspect of the present invention, provided herein is a method for processing a notification message by a machine-to-machine (M2M) device, the method comprising: processing at least one notification message by the M2M device; and transmitting the processed notification message, wherein: the at least one notification message is generated by an originator device detecting a change in a subscribed-to resource comprising a subscription resource configured in the originator device as a child resource; the at least one notification message comprises enforcement information configured based on policy information configured in the originator device in order to process the at least one notification message; the at least one notification message is processed based on the enforcement information; the processed notification message is transmitted with including the enforcement information; and the subscription resource and the subscribed-to resource indicate a uniquely addressable data structure using a unique address.

In another aspect of the present invention, provided herein is machine-to-machine (M2M) device comprising: a network interface unit; and a processor operatively connected to the network interface unit, wherein: the processor is configured to process at least one notification message and to transmit the processed notification message; the at least one notification message is generated by an originator device detecting a change in a subscribed-to resource comprising a subscription resource configured in the originator device as a child resource; the at least one notification message comprises enforcement information configured based on policy information configured in the originator device in order to process the at least one notification message; and the at least one notification message is processed based on the enforcement information; the processed notification message is transmitted with including the enforcement information; and the subscription resource and the subscribed-to resource indicate a uniquely addressable data structure using a unique address.

Preferably, the processing of the received notification message comprises: discarding the notification message when the enforcement information has a first value; storing the received notification message and discarding a previously stored notification message when the enforcement information has a second value; and storing all the received notification message when the enforcement information has a third value.

Preferably, the notification message further comprises address information of the subscription resource; and the processing comprises processing notification messages with the same address information among the at least one notification message according to the enforcement information.

Preferably, the enforcement information is configured to have a value corresponding to a value of the policy information.

Preferably, the enforcement information comprises address information indicating the policy information.

Preferably, the enforcement information is included in information indicating an event category within the notification message.

Preferably, the M2M device is the same as the originator device.

Preferably, the M2M device is a transit device that is not the originator device and a device receiving the transmitted notification message.

Advantageous Effects

According to the present invention, a signal may be effectively transmitted and received in a machine-to-machine (M2M) system.

According to the present invention, a notification message may be transmitted and received in an environment in which a connection state between entities is not ensured in a M2M system.

According to the present invention, data transmission efficiency and overall system performance may be enhanced by not transmitting an unnecessary notification message in a M2M system.

According to the present invention, an important message as configured by a user may be preferentially transmitted by setting priority of a notification message in a M2M system.

According to the present invention, a notification message may be efficiently transmitted in consideration of an entity forwarding the notification message in a M2M system.

According to the present invention, a notification message can be dynamically reconfigured by a transit entity that forwards the notification message in a M2M system.

It will be appreciated by persons skilled in the art that that the effects that could be achieved with the present invention are not limited to what has been particularly described hereinabove and other advantages of the present invention will be more clearly understood from the following detailed description taken in conjunction with the accompanying drawings.

DESCRIPTION OF DRAWINGS

The accompanying drawings, which are included to provide a further understanding of the invention, illustrate embodiments of the invention and together with the description serve to explain the principle of the invention.

FIG. 18 illustrates a notification procedure according to the present invention.
FIG. 19 illustrates an example of a notification procedure.

MODE FOR INVENTION

The preferred embodiments of the present invention will now be described in detail with reference to the accompanying drawings. The detailed description, which will be given below with reference to the accompanying drawings, is intended to explain exemplary embodiments of the present invention, rather than to show the only embodiments that can be implemented according to the present invention. The following detailed description includes specific details in order to provide a thorough understanding of the present invention. However, it will be apparent to those skilled in the art that the present invention may be implemented without such specific details.

When describing the present invention, in order to avoid obscuring the concepts of the present invention, a well-known structure or device may be omitted and important functions of the structures and devices may be shown in a form of block diagram. The same reference numbers will be used throughout the drawings to refer to the same or like parts.

In the present invention, a machine-to-machine (M2M) device refers to a device for M2M communication. The M2M device may be fixed or mobile. The M2M device may transmit and receive user data and/or control information to/from a M2M server by communicating with the M2M server. The M2M device may be referred to as terminal equipment, Mobile Station (MS), Mobile Terminal (MT), User Terminal (UT), Subscriber Station (SS), wireless device, Personal Digital Assistant (PDA), wireless modem, handheld device, etc. In the present invention, the M2M server may refer to a server for M2M communication, and may be implemented as a fixed station or a mobile station. In the present invention, when a network to which a M2M device is attached and a network to which a M2M server is attached are different from each other, a M2M gateway refers to an apparatus serving as a connection point entering from one network to the other network. Further, a M2M gateway may perform a function as a M2M device, and, for example, may perform a function such as managing a M2M device connected to the M2M gateway, receive one message and forward the message or a modified message to M2M devices connected to the M2M gateway, or a message aggregation. The term "M2M device" may be used to collectively refer to a M2M gateway and a M2M server, and thus a M2M gateway or a M2M server may be referred to as a M2M device.

In addition, in the present specification, the term "entity" may refer to a hardware such as a M2M device, a M2M gateway, or a M2M server, or the term "entity" may refer to a software component of M2M application layer or M2M (common) service layer as described below.

In the present specification, the present invention is described on the basis of a M2M system, but the present invention is not limited to the M2M system. For example, the present invention may be applied to a system in accordance with a client-server (or sender-responder) model in a similar/same manner.

Figure 1:
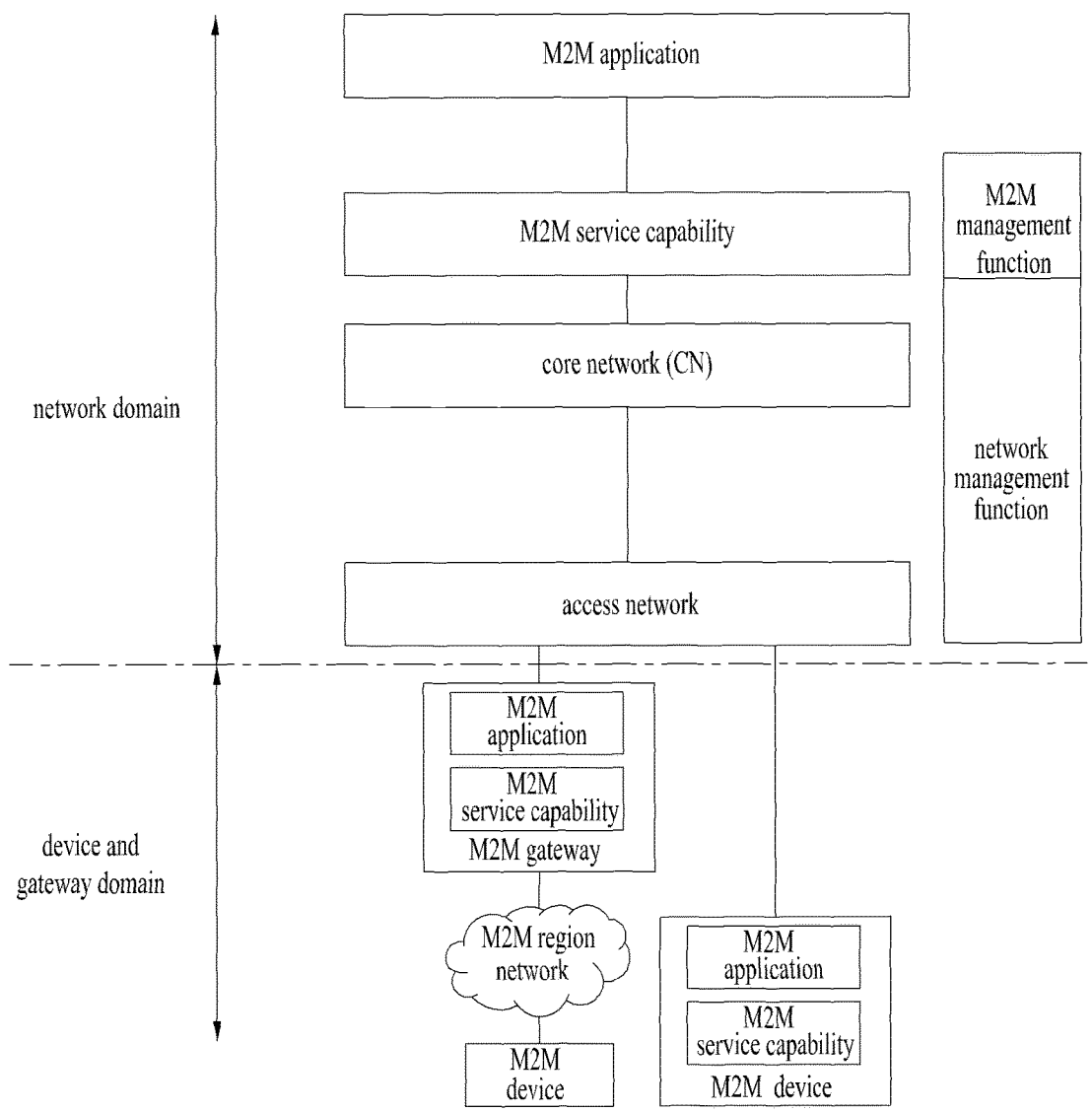
FIG. 1 illustrates an example of a M2M system.

FIG. 1 illustrates an example of a M2M system. FIG. 1 illustrates an example of a M2M system in accordance with ETSI (European telecommunications standards institute) TS (technical specification).

The M2M system in accordance with the ETSI TS defines a common M2M service framework for various M2M applications. A M2M application may indicate a software component implementing such a M2M service solution as e-health, city automation, a connected consumer, automotive and the like. The M2M system provides functions commonly required for implementing the various M2M applications, and the commonly required functions may be referred to as a M2M service or a M2M common service. If the M2M common service is used, a M2M application may be easily implemented without configuring a basic service framework again for each M2M application.

The M2M service is provided in a form of a set of service capability (SC), the M2M application may access the set of SC (service capability) via an open interface and may use a M2M service or function provided by the SC (service capability). SC may provide a function constructing a M2M service (e.g. device management, location, discovery, group management, registration, security, etc). A service capabilities layer (or SC layer) or a service capability entity (or SC entity) may correspond to a set of functions for a M2M service which may be used when a M2M application is provided on a service framework.

The SC (service capability) may be represented as xSC. In this case, x may be represented by one of N, G and D. The x indicates where the SC (service capability) exists among a network (and/or a server), a gateway and a device. For example, NSC indicates SC (service capability) existing in a network and/or a server, and GSC indicates SC (service capability) existing in a gateway.

A M2M application may exist in a network, a gateway or a device. The M2M application existing in a network or a directly connected with a server may be referred to as a M2M network application, or may be simply referred to as a NA (network application). For example, the NA corresponds to software which is implemented in a manner of being directly connected with a server, and the NA may perform a role of communicating with a M2M gateway or a M2M device and managing the M2M gateway and the M2M device. The M2M application existing in the device may be referred to as a M2M device application, or may be simply referred to as a DA (device application). For example, the DA corresponds to software which is implemented in a M2M device, and the DA may be able to deliver sensor information and the like to the NA. The M2M application existing in the gateway may be referred to as a M2M gateway application, or may be simply referred to as a GA (gateway application). For example, the GA may play a role of managing a M2M gateway, and the GA may provide a M2M service or function (e.g. SCs (service capabilities) or SC (service capability)) to the DA. The M2M application may collectively refer to an application entity (AE) or an application layer.

Referring to FIG. 1, a M2M system architecture may be divided into a network domain and a device and gateway domain. The network domain may include functions for M2M system management and functions for network management. The functions for the M2M system management may be performed by M2M SCs (service capabilities) and a M2M application managing device existing in the device and gateway domain. The function for network management may be performed by a core network and an access network. Hence, in the example shown in FIG. 1, the core network and the access network provide connection between entities rather than performing a M2M function. M2M communication may be performed between M2M SCs (service capabilities) in the network domain and the device and gateway domain via the core network and the access network. A M2M application of each domain may give and take a signal or information via M2M SCs (service capabilities) of a corresponding domain.

The access network corresponds to an entity enabling a M2M device and gateway domain to communicate with a core network. Examples of the access network include xDSL (digital subscriber line), HFC (hybrid fiber coax), satellite, GERAN, UTRAN, eUTRAN, wireless LAN, WiMAX and the like.

The core network corresponds to an entity providing a function such as IP (internet protocol) connection, service and network control, interconnection, roaming and the like. The core network includes a 3GPP (3rd generation partnership project) core network, an ETSI TISPAN (telecommunications and internet converged services and protocols for advanced networking) core network, a 3GPP2 core network, and the like.

M2M SC (service capability) provides a M2M common service function (CSF) capable of being shared by various M2M network applications, and exposures a M2M service via an open interface, thereby enabling M2M applications to use the M2M service. A layer including such M2M SC entities or M2M common service functions may be referred to as M2M SCL (service capability layer).

A M2M application corresponds to an entity operating service logic and being capable of using M2M SCs (service capabilities) via an open interface. A M2M application layer may refer to a layer including the M2M application and a related operational logic.

A M2M device corresponds to an entity operating a M2M device application via M2M SCs (service capabilities). The M2M device may directly communicate with a M2M server of a network domain, or may communicate with the M2M server of the network domain via a M2M gateway. In case of being connected via a M2M gateway, the M2M gateway operates like a proxy. The M2M device may include a M2M application and/or M2M SCs (service capabilities).

A M2M area network provides connectivity between a M2M device and a M2M gateway. In this case, a network between the M2M gateway and a M2M server and a network between the M2M device and the M2M gateway may be different from each other. For example, the M2M area network may be implemented using a PAN (personal area network) technology such as IEEE 802.15.1, Zigbee, Bluetooth, IETF ROLL, ISA 100.11a and a local network technology such as PLC (power line communication), M-BUS, wireless M-BUS, KNX and the like.

The M2M gateway is an entity managing a M2M application via M2M SCs (service capabilities) and providing a service to the M2M application. The M2M gateway may perform a role of a proxy between a M2M device and a network domain and may perform a role of providing a service to an ETSI non-compliant M2M device. The M2M gateway may refer to an entity having a function of a gateway among M2M devices. The M2M gateway may include a M2M application and/or M2M SCs (service capabilities).

The M2M architecture shown in FIG. 1 is just an example and a name of each entity may vary. For example, M2M SC (service capability) may be referred to as a M2M common service function (CSF), and a SCL (service capability layer) may be referred to as a common service layer (CSL) or common service entity (CSE). A M2M application may be referred to as an application entity (AE), and a M2M application layer may be simply referred to as an application layer. Similarly, a name of each domain may vary as well. For example, in oneM2M system, a network domain may be referred to as an infrastructure domain, and a device and gateway domain may be referred to as a field domain.

As shown in FIG. 1, a M2M system may be construed as a layered structure including a M2M application layer and a M2M SC (service capability) layer for M2M communication.

Figure 2:
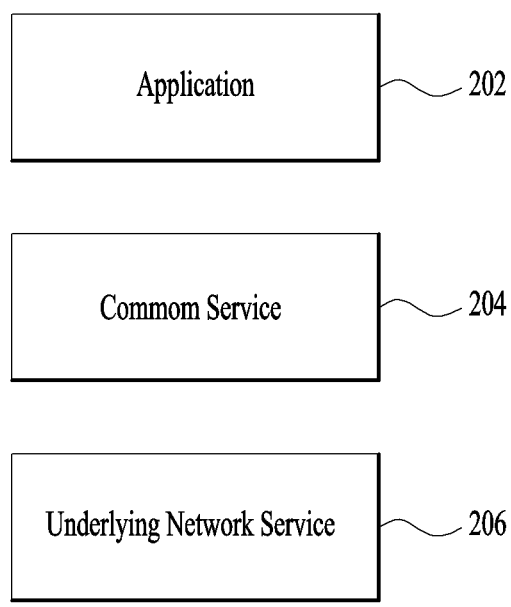
FIG. 2 illustrates an example of a layered structure of a M2M system.

FIG. 2 illustrates an example of a layered structure of a M2M system.

Referring to FIG. 2, a M2M system may include an application layer 202, a common service layer 204 and an underlying network services layer 206. As described in the above, application layer 202 may correspond to a M2M application layer, and common service layer 204 may correspond to a M2M SCL. Underlying network services layer 206 provides services such as device management, a location service and device triggering to common service layer 204 in a core network.

Figure 3:
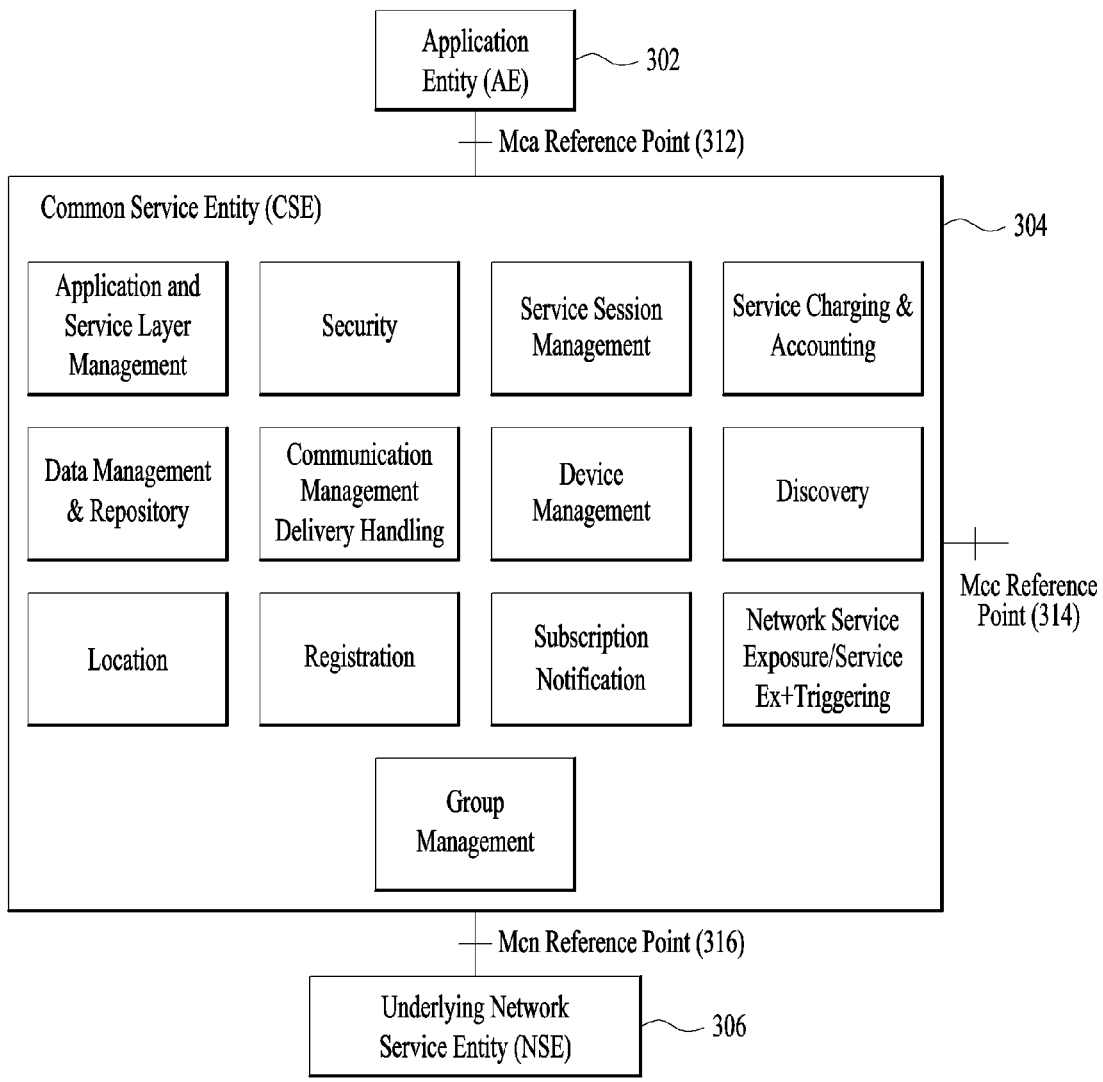
FIG. 3 illustrates an example of a functional architecture of a M2M system.

FIG. 3 illustrates an example of a functional architecture of a M2M system. In terms of functionality, M2M system architecture may include an application entity (AE) 302, a common service entity (CSE) 304, and an underlying network service entity (NSE) 306. Each of entities 302, 304, 306 may communicate with each other via a reference point supported by common service entity 304. The reference point plays a role in designating a communication flow between entities 302, 304, 306. The reference point may be represented as Mcx, and Mc means "M2M communications". In the present specification, a Mca reference point, a Mcc reference point and a Mcn reference point may be denoted as Mca, Mcc and Mcn, respectively.

Referring to FIG. 3, Mca reference point 312 designates a communication flow between application entity (AE) 302 and common service entity (CSE) 304. Mca reference point 312 enables AE 302 to use a service provided by CSE 304, and enables CSE 304 to communicate with AE 302. Mca reference point 312 may indicate an interface between a M2M application layer and a M2M common service layer (or entity).

Mcc reference point 314 designates a communication flow between different common service entities (CSEs) 304. Mcc reference point 314 enables CSE 304 to use a service of another CSE when CSE 304 provides a required function. A service provided by Mcc reference point 314 may be dependent on the functions supported by CSE 304. Mcc reference point 314 may indicate an interface between M2M common service layers.

Men reference point 316 designates a communication flow between CSE 304 and underlying network service entity (NSE) 306. In order to make CSE 304 provide a required function, Men reference point 316 enables the CSE to use a service provided by NSE 306. Men reference point 316 may indicate an interface between the M2M common service layer and the M2M underlying network layer.

In the example shown in FIG. 3, CSE 304 may provide various common service functions (CSFs). For example, CSE 304 may include at least one of an application and service layer management function, a communication management and delivery handling function, a data management and repository function, a device management function, a group management function, a discovery function, a location function, a network service exposure/service execution and triggering function, a registration function, a security function, a service charging and accounting function, a service session management function, or a subscription/notification function. CSE 304 represents an instance of the common service functions and provides a subset of the common service functions capable of being used and shared by M2M applications. The common service functions are briefly explained in the following.

Application and service layer management (ASM): provides a function of managing AEs and CSEs. For example, the ASM function may configure a function of a CSE, troubleshoot the function of the CSE, and upgrade the function Moreover, the ASN function may upgrade a function of an AE.

Communication management and delivery handling (CMDH): provides a communication with another CSEs, AEs and NSEs. For example, the CMDH function may determine when and how to use a connection for CSE-to-CSE communication and may control specific requests to be delivered in a manner of being delayed.

Data management and repository (DMR): enables M2M applications to exchange and share data with each other. For example, the DMR function may collect a great amount of data, aggregate the data with each other, convert the data into a specific format, and store the converted data.

Device management (DMG): manages a device function not only for a M2M gateway and a M2M device but also for devices existing in a M2M area network. For example, the DMG function may perform application installation and configuration, firmware update, logging, monitoring, diagnostics, network topology management and the like.

Discovery (DIS): searches for information such as information and a resource within a given range and condition according to a request.

Group management (GMG): For example, a group may be generated by combining a resource, a M2M device or a M2M gateway with each other, this function handles a group-related request.

Location (LOC): This function enables a M2M application to obtain location information of a M2M device or a M2M gateway.

Network service exposure/service execution and triggering (NSSE): enables communication of an underlying network to be performed and makes a service or a function provided by the underlying network available.

Registration (REG): This function enables a M2M application or another CSE to register to a specific CSE. Registration is performed to use a M2M service function of the specific CSE.

Security (SEC): performs a role in handling of sensitive data such as a security key, establishing security-related association, authentication, authorization, protecting ID (identity) and the like.

Service charging and accounting (SCA): performs a role in providing a charging function to an AE or CSE.

Service session management (SSM): performs a role in managing a M2M session of a service layer for end-to-end communication.

Subscription/notification (SUB): in case of subscribing a change of a specific resource, when the resource is changed, performs a role of notifying the change.

Figure 4:
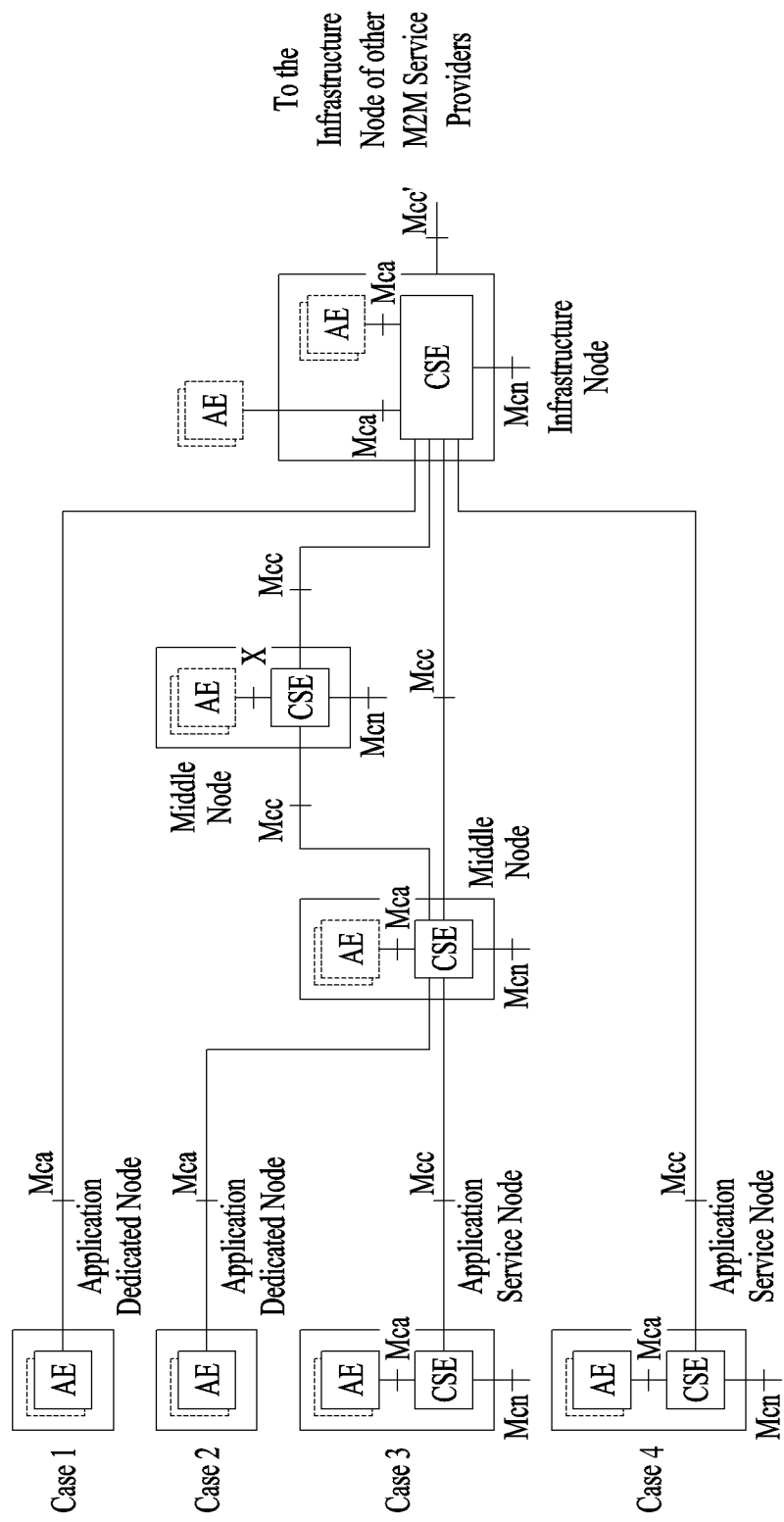
FIG. 4 illustrates an example of a M2M system configuration.

FIG. 4 illustrates an example of a M2M system configuration. In the present specification, a node corresponds to an entity including one or more M2M applications or an entity including one CSE and zero or more M2M application.

A node including at least one or more application entities (AEs) but not including a common service entity (CSE) may be referred to as an application dedicated node (ADN). The ADN may communicate with one middle node (MN) or one infrastructure node (IN) via a Mca. The ADN may be referred to as a M2M device having a constrained capability. In this case, the M2M device having a constrained capability may correspond to a M2M device not including a common service layer or a common service entity (CSE). The M2M device having a constrained capability may be simply referred to as a constrained M2M device.

A node having at least one common service entity (CSE) and at least one or more M2M application entity (AE) may be referred to as an application service node (ASN). The ASN may communicate with one middle node or one infrastructure node via a Mcc. The ASN may be referred to as a M2M device.

A node including one common service entity (CSE) and zero or more M2M application entity (AE) may be referred to as a middle node (MN). The MN may communicate with one infrastructure node (IN) or another middle node (MN) via a Mcc. Or, the MN may communicate with IN/MN/ASN via the Mcc. Or, the MN may communicate with an ADN via a Mca. The MN may be referred to as a M2M gateway.

A node having a common service entity (CSE) and including zero or more application entity (AE) may be referred to as an infrastructure node (IN). The IN may communicate with at least one middle node (MN) and/or at least one ASN. Or, the IN may communicate with one or more ADNs via a Mca. The IN may be referred to as a M2M server.

Referring to FIG. 4, case 1 shows an example of communication performed between ADN and IN. ADN may correspond to a M2M device having a constrained capability. In this case, since ADN does not include a CSE or a common service layer, ADN may communicate with a CSE of IN via Mca. In this case, since ADN does not include a CSE or a common service layer, ADN may not store data generated by an AE or an application layer of ADN and may not share the data with another entity. Hence, in the case 1, the data generated by the AE or the application layer of ADN may be stored and shared in the CSE of IN.

Case 2 shows an example of communication performed between ADN and MN. ADN may also correspond to a M2M device having a constrained capability. Hence, ADN may operate similarly to an operation of case 1 except that ADN is communicating with a CSE of MN. In particular, the ADN may communicate with the CSE of the MN via a Mca. And, since ADN does not include a CSE or a common service layer, ADN may not store data generated by an AE or an application layer of ADN or share the data with another entity. Hence, the data generated by the AE or the application layer of ADN may be stored and shared in the CSE of IN.

Meanwhile, in case 2, MN may communicate with IN via MN. In this case, MN and MN may communicate with each other and MN and IN may communicate with each other via Mcc. MN may communicate with IN without passing through MN.

Case 3 shows an example of communication performed between ASN and MN. Unlike case 1 or case 2, since ASN includes a CSE or a common service layer, data generated by an AE or an application layer of ASN may be stored in the CSE or the common service layer of ASN. And, the AE of ASN may communicate with a CSE of MN via the CSE of ASN.

Case 4 shows an example of communication performed between ASN and MN. Compared to case 3, a CSE of ASN may directly communicate with a CSE of IN without passing through a MN.

IN or may be located in an infrastructure domain or a network domain and may include one CSE and zero or more AE. INs may communicate with each other via Mcc.

Figure 5:
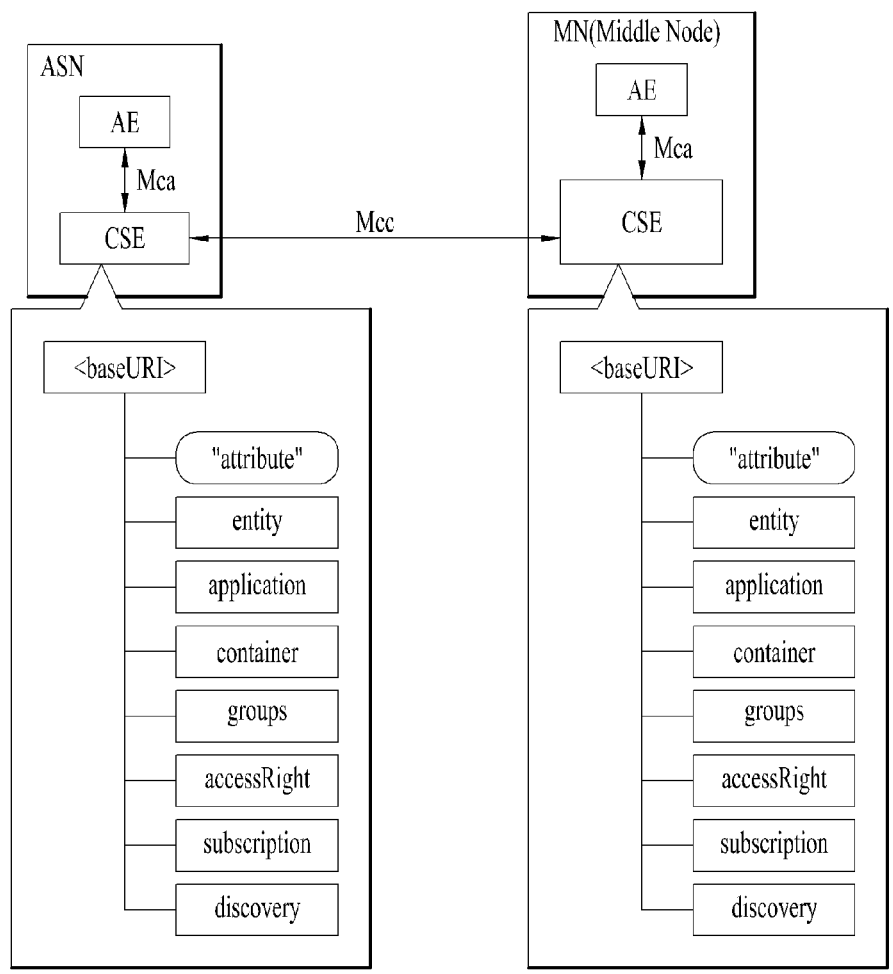
FIG. 5 illustrates an example of a resource used in a M2M system.

FIG. 5 illustrates an example of a resource used in a M2M system.

In a M2M system, an application entity (AE), a CSE, data and the like may be represented as a resource. In a M2M system, a data structure that can be uniquely addressed using a unique address (e.g., URI (universal resource identifier or uniform resource identifier)) is referred to as a resource. In a M2M system, a resource may be represented as a specific data structure, and resources may be logically connected with each other. Hence, a M2M device, a M2M gateway, a CSE or a common service layer of a M2M server may include a resource. On the contrary, an AE or application layer of the M2M system may not have a resource. A resource has a child resource and an attribute. A root resource of a M2M resource may have an attribute and a child resource. For example, a type of the root resource may be denoted by <baseURI> or <CSEBase>. A resource type may be denoted by "<" and ">".

Various resources are defined in a M2M system. M2M applications may perform communication based on a resource which is an instantiation of a resource type. For example, a resource may be used for a M2M service such as registration of an application, reading a sensor value and the like. When an instance of a corresponding resource type is generated, unique address information (e.g., URI) is given to each resource. Similar to a root resource, each resource may include an attribute and a child resource, and may be addressed using unique address information. A specific resource type defines a child resource and an attribute which a resource may have when instantiation. When an instantiation of a specific resource is performed, a resource may have an attribute and a child resource defined by a resource type of the specific resource.

An attribute stores information about a resource itself and may not include a child resource. A child resource may include an attribute and a child resource of its own.

For example, a child resource may be a remote CSE resource, an application entity resource, an access control resource, a container resource, a group resource, a subscription resource, and the like.

Remote CSE resource: includes information of another CSE registered (connected) to a corresponding CSE. For example, a type of the remote CSE resource may be denoted by <entity> or <remoteCSE>.

Application entity resource: a resource located under an application entity resource (e.g. <baseURI>/<application> or <CSEBase>/<AE>) of a root resource or a remote CSE resource (e.g. <baseURI>/<entity> or <CSEBase>/<remoteCSE> of a root resource. If an application entity resource is located under an application entity resource (e.g. <baseURI>/<application> or <CSEBase>/<AE>) of a root resource, the application entity resource stores information of an application entity registered (or connected) to a corresponding CSE. If an application entity resource is located under a remote CSE resource (e.g. <baseURI>/<entity> or <CSEBase>/<remoteCSE> of a root resource, the application entity resource stores information of an application entity registered to a specific remote CSE. For example, a type of an application entity resource may be denoted by <application> or <AE>.

Access control resource: a resource storing information related to access rights. Authorization may be performed using access right information included in the access control resource.

Container resource: stores data per CSE or AE. For example, a container resource may be denoted by <container>.

Group resource: enables a function of grouping several resources into a group and processing as one group. For example, a type of a group resource may be denoted by <group>.

Subscription resource: performs a function of notifying a change of a resource status via a notification. For example, a type of a subscription resource may be denoted by <subscription>.

Figure 6:
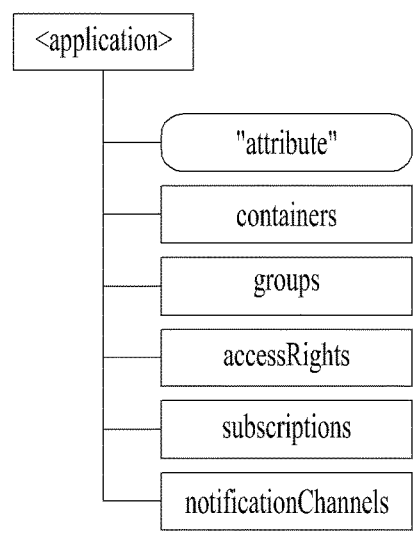
FIG. 6 illustrates an example of a resource for a M2M application.

FIG. 6 illustrates an example of a resource for a M2M application. As described in the above, a resource for a specific M2M application may be stored in an application resource among resources of a CSE or common service layer of a M2M gateway. The resource for the specific M2M application may have an attribute and a child resource. In the example of FIG. 6, a child resource is represented as a type (e.g. denoted by "<", ">") and a real name of the child resource is assigned and stored when an instantiation is performed.

Figure 7:
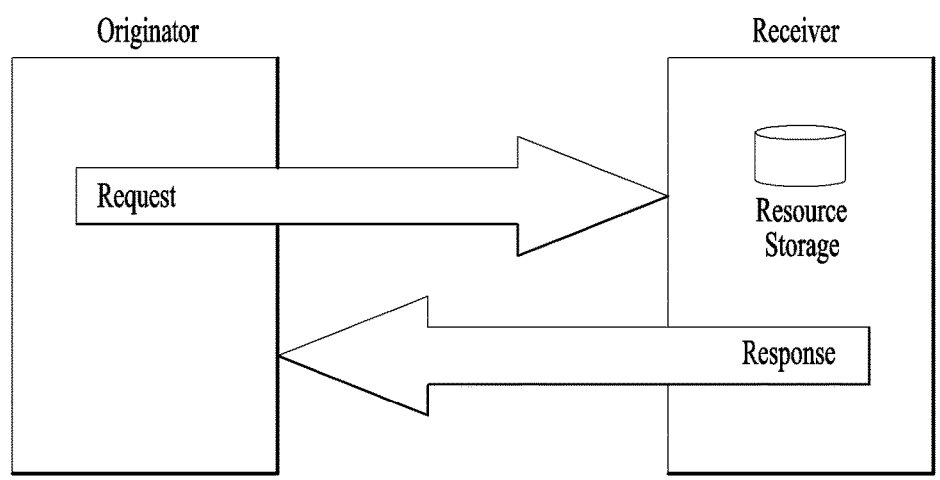
FIG. 7 illustrates an exemplary communication flow of a general M2M system.

FIG. 7 illustrates an exemplary communication flow of a general M2M system. In general, an operation of a M2M system may be performed on the basis of data exchange. For example, in order for a specific device to stop an operation of another device, the specific device may transmit a corresponding command to the another device in a form of data. In order to store data in a device, a data structure having a specific format may be used, and this data structure is referred to as a resource. The resource may be accessible using a unique address (e.g., URI).

Referring to FIG. 7, a Request and Response Scheme may be used for AE-to-CSE connection or CSE-to-CSE connection. An originator may transmit a request message to a receiver so as to request a resource stored in the receiver, and may receive a response message in response to the request message. Likewise, the receiver may receive a request message for requesting a resource from the originator, and may transmit a response message to the originator upon receiving the request message. In the present specification, the request message may also be referred to as a request, and the response message may also be referred to as a response. A request message to be transmitted from the originator to the receiver may have the following information.

op: a form of operation to be executed. 'op' may be one of Create, Retrieve, Update, Delete, or Notify. In the present specification, information corresponding to operation may be referred to as a command.

to: URI (Uniform Resource Identifier) of a target resource.

fr: identification information (or ID) of an originator having generated the request.

mi: meta information regarding the corresponding request.

cn: content of a resource to be transferred.

ec: indicates event category used for handling a request. The event category affects how a request accessing a remotely-hosted resource is processed by a receiver (e.g. CMDH CSF of the receiver). For example, an event category represents information indicating a priority of an originator request. "ec" of a request message may be set to for example a value such as 'immediate', 'bestEffort', or 'latest'. In the case that ec is set to 'immediate', since a request in this category means a important request, the request in this category is transmitted as soon as possible, and additional processing is not performed. For example, in case that it is possible to communicate via an underlying network, such a request may be transmitted without being stored in a CMDH buffer. In the case that ec is set to 'bestEffort', a request in this category may be stored in a CMDH buffer by a CSE for an arbitrary time, and may be transmitted via Mcc on a best effort basis. In the case that ec is set to 'latest', a request in this category goes through a normal CMDH processing, and old requests are replaced by a latest request within a maximum buffer size if requests are pending.

If the corresponding request is successfully carried out, the response message may include the following information. The response message may include at least one of the following information, or may include only the result value (rs).

to: identification information (or ID) of an originator having generated the request.

fr: identification information (or ID) of a receiver having received the request.

mi: meta information regarding the request.

rs: the result (e.g., Okay, Okay and Done, Okay and in progress) of the request.

ai: additional information.

cn: content of a resource to be transmitted.

If the corresponding request fails, the response message may include the following information.

to: an originator having generated the request.

fr: ID of a receiver having received the request.

mi: meta information regarding the request.

rs: the result (e.g., Not Okay) of the request.

ai: additional information

In the present specification, an originator indicates an originator (or transmitting) device or originator (or transmitting) entity (or a CSE or an AE of the originator device) and a receiver indicates a receiving (or receiver) device or receiving (or receiver) entity (or a CSE or an AE of the receiving device). An entity that relays a message transmitted from an originator device and forwards the message to a receiving device in the middle of the originator device and the receiving device may be referred to as a transit device or transit entity (or CSE of the transit device). And, a device (or a CSE of the device) including a resource may be referred to as a hosting device or hosting entity (or a hosting CSE).

Figure 8:
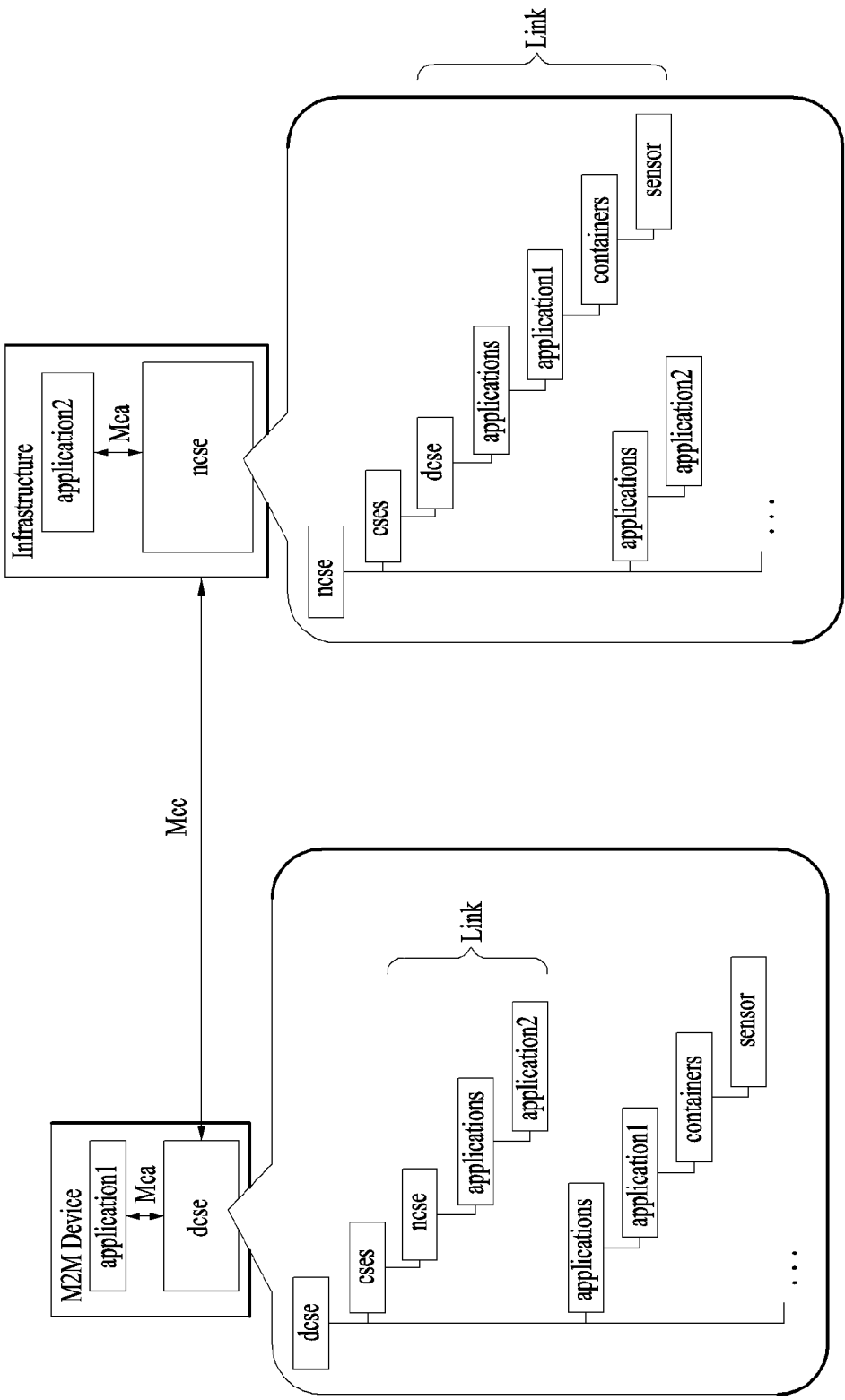
FIG. 8 illustrates an example of different entities interoperating with each other in a M2M system.

FIG. 8 illustrates an example of different entities interoperating with each other in a M2M system.

Referring to FIG. 8, it shows an example that an AE (application 2) registered to an IN (infrastructure node) interoperates with a M2M device. For example, the M2M device may include a sensor which is a physical device, and the AE registered to the IN may retrieve a value of the sensor of the M2M device.

An AE (application1) existing on a M2M device reads a value from a sensor and stores the value in a CSE (dcse) to which the AE is registered in a resource form (e.g., <container> resource). To this end, the AE (application1) existing on the M2M device should register to the CSE existing in the M2M device. As shown in an example of FIG. 8, if the registration of the AE is completed, information related to the registered M2M application is stored in a form of a resource dcse/applications/application. For example, if a sensor value of the M2M device is stored by the AE (application1) in a container resource under the resource dcse/applications/application1, the AE (application2) registered to the IN (infrastructure node) may access the sensor value. And, in order for the AE (application2) to access the M2M device, the AE (application2) should be register to a CSE (ncse) of the IN (infrastructure node). Similar to the AE (application1) register being registered to the CSE (dcse), information about the AE (application2) is stored in a resource ncse/applications/application2. And, the AE (application1) and the AE (application2) may communicate with each other via the CSE (ncse) and the CSE (dcse) instead of directly communicating with each other. To this end, it is necessary for the CSE (ncse) and the CSE (dcse) to be register to each other. If the CSE (dcse) registers to the CSE (ncse), information (e.g., link) related to dcse is stored under a resource ncse/cses/dcse resource. As such, the AE (application2) may obtain a path capable of accessing information of the AE (application 1) and may be then able to read a sensor value using the path.

Figure 9:
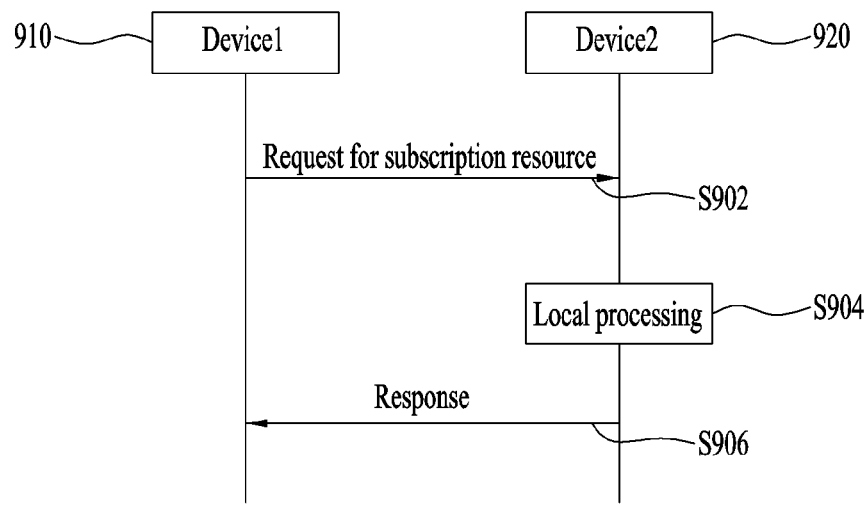
FIG. 9 illustrates an example of a procedure related to a subscription resource.

FIG. 9 illustrates an example of a procedure related to a subscription resource.

In a M2M system (e.g., oneM2M), as a resource changes, an entity interested in the change of the resource may subscribe to a notification of the change. In this case, in order to subscribe to the notification, a resource for subscription should be configured. The resource for subscription may be referred to as a subscription resource or a <subscription> resource. When a subscription resource is created/configured, if a modification/change satisfying a condition configured in the subscription resource occurs in a subscription target resource (also referred to as a subscribed-to resource or a subscribed resource), a device (or an entity) in which the subscription resource is configured may transmit a notification to an address configured in the subscription resource. A device (or an entity) in which a subscription resource is configured and/or which includes a subscription target resource is referred to as a hosting device (or a hosting entity). For example, a subscription target resource may exist in a CSE of a M2M gateway. In this case, the M2M gateway is referred to as a hosting device and the CSE of the M2M gateway is referred to as a hosting CSE.

A subscription procedure may be performed using a subscription resource in a resource-oriented manner. For example, a subscription resource may be created to subscribe to a specific subscription target resource, a condition for subscription may be changed by modifying a subscription resource, and a subscription resource may be deleted when subscription is not needed anymore.

A subscription resource includes information about a subscription target resource (or subscribed-to resource). A relation between the subscription target resource and the subscription resource may be represented as a parent-child relation. For example, a <container> resource including a subscription target resource may have a <subscription> resource as a child resource. When a parent subscription target resource is deleted, the <subscription> resource may be deleted.

If a subscription resource corresponds to a child resource, a notification for indicating a status change of a parent resource may be delivered to an entity specified in address information (e.g. a notificationURI or contact attribute) in the subscription resource according to configuration (or attribute configuration) of the subscription resource. If an originator has a RETRIEVE (or READ) permission for a subscribable resource, the originator may create a subscription resource. The originator of the subscription resource becomes a resource subscriber. If a modification to a subscription target resource occurs, it is able to determine whether to transmit a notification to the resource subscriber by comparing the modification and a specific attribute (e.g., notificationCriteria attribute) with each other.

A subscription resource (e.g., <subscription> resource) may have various attributes and child resources. For example, the subscription resource (e.g., <subscription> resource) may have attributes shown in Table 1. In Table 1, R/W indicates read/write permission, and may correspond to one of READ/WRITE (RW), READ ONLY (RO), or WRITE ONLY (WO). Table 1 is just an example. An attribute of a subscription resource may be configured in a manner of being different from Table 1.

TABLE 1

| Attribute Name | R/W | Description |
| --- | --- | --- |
| resourceType | WO | Resource Type. |
| resourceID | WO | This attribute is an identifier for resource that is used for 'non-hierarchical URI method' or 'IDs based method' cases. |
| parentID | RO | The system shall assign the value to this attribute according to the parameters given in the CREATE Request. |
| expirationTime | RW | Time/date after which the resource will be deleted by the hosting CSE. This attribute can be provided by the issuer, and in such a case it will be regarded as a hint to the hosting CSE on the lifetime of the resource. |
| creationTime | RO | Time/date of creation of the resource. |
| lastModifiedTime | RO | Last modification time/date of the resource. |
| accessControlPolicyIDs | RW | The attribute contains a list of identifiers (either an ID or a URI depending if it is a local resource or not) of an <accessControlPolicy> resource. The privileges defined in the <accessControlPolicy> resource that are referenced determine who is allowed to access the resource containing this attribute for a specific purpose (e.g. Retrieve, Update, Delete, etc.). |
| notificationCriteria | RW | When notification events happen on the subscribed-to resource, the list of notification events that match the notification criteria shall be sent as a Notify request. |

TABLE 1-continued

| Attribute Name | R/W | Description |
|---|---|---|
| expirationCounter | RW | When the number of notifications becomes the same as this counter, the <subscription> resource shall be deleted. |
| notificationURI | RW | List of URI(s) where the resource subscriber will receive notifications. This list of URI(s) may not represent the resource subscriber entity. |
| aggregationURI | RW | URI to aggregate notifications from group members of a <group> resource. |
| batchNotify | RW | Indicates that notifications should be batched for delivery. When set, notification events are temporarily stored until either a specified number is ready to send or until a duration after the first notification event has expired. |
| rateLimit | RW | Indicates that notifications should be rate-limited. When set, notification events that exceed a specified number within a specified time are temporarily stored then sent when the number of events sent per specified time falls below the limit. |
| priorSubscriptionNotify | WO | Indicates that when this subscription is created, whether notification events prior to subscription should be sent, e.g. send prior "n" notifications, if available. |
| notificationStoragePriority | RW | Indicates a priority for this subscription relative to other subscriptions belonging to this same subscriber for retention of notification events when storage is congested. |
| notificationStructure | RW | Type of information that shall be contained in notifications. E.g., modified attribute only of a subscribed-to resource, a whole subscribed-to resource, and/or URI of a corresponding <subscription> resource. |
| subscriberURI | WO | URI that the <subscription> created entity can get notification from the <subscription> hosting CSE. <subscription> deletion shall be notified if this URI is provided. |

In an example of Table 1, a filtering attribute (e.g., notificationCriteria) corresponds to a list of conditions for modification/change of a subscription target resource, and each of the conditions may be in a logical AND relation. For example, when the filtering attribute (e.g., notificationCriteria) includes two conditions, if modification/change of a subscription target resource satisfies all of the two conditions, a notification may be transmitted. An amount of a notification message may be adjusted by configuring a filtering attribute to a subscription resource. If a notification is configured to be transmitted to a notification target entity only when the configured filtering attribute is satisfied, the problem of excessive notification messages may be prevented. Table 2 shows an example of conditions that may be included in the filtering attribute.

TABLE 2

| Condition tag | Matching condition |
|---|---|
| createdBefore | The creationTime attribute of the subscribed resource is chronologically before the specified value. |
| createdAfter | The creationTime attribute of the subscribed resource is chronologically after the specified value. |
| modifiedSince | The lastModifiedTime attribute of the subscribed resource is chronologically after the specified value. |
| unmodifiedSince | The lastModifiedTime attribute of the subscribed resource is chronologically before the specified value. |
| stateTagSmaller | The stateTag attribute of the resource is smaller than the specified value. |
| stateTagBigger | The stateTag attribute of the resource is bigger than the specified value. |
| expireBefore | The expirationTime attribute of the subscribed resource is chronologically before the specified value. |
| expireAfter | The expirationTime attribute of the subscribed resource is chronologically after the specified value. |
| labels | The labels attributes of the subscribed resource matches the specified value. |
| resourceType | The resourceType attribute of the child resource of the subscribed-to resource is the same as the specified value. It allows notification of child resource creation and deletion. |
| sizeAbove | The contentSize attribute of the <contentInstance> resource is equal to or greater than the specified value. |
| sizeBelow | The contentSize attribute of the <contentInstance> resource is smaller than the specified value. |
| contentType | When the subscribed-to resource is changed by the operations or expiration, the resource status is the same as the specified value. Possible values are: child created, updated, child deleted, deleted. |
| operationMonitor | The operations accessing the subscribed-to resource matches with the specified value. It allows monitoring which operation is attempted to the subscribed-to resource regardless of whether the operation is performed. This feature is useful when to find malicious AEs. Possible string arguments are: create, retrieve, update, delete. |
| attribute | This is an attribute of resource types. Therefore, a real tag name is variable depends on its usage. E.g., creator of container resource type can be used as a filter criteria tag as "creator = Sam". |

Further, a subscription resource (e.g. <subscription> resource) may have a scheduling resource (e.g. <schedule> resource) as a child resource, the scheduling resource including scheduling information. In the case that a scheduling resource is configured as a child resource of a specific resource, the scheduling resource indicates scheduling information in the context of its parent's resource. The scheduling resource (e.g. <schedule>) defines reachability schedule information of the corresponding node. When the scheduling resource is instantiated as a child resource of a subscription resource, the scheduling resource may be referred to as a notification scheduling resource (e.g. notificationSchedule resource). In the present specification, the scheduling resource or notification scheduling resource (e.g. <schedule> or notificationSchedule resource) may be briefly referred to as a scheduling resource. For example, in case that a scheduling resource is a child resource of a subscription resource, scheduling information configured in the scheduling resource may indicate scheduling information for notification of the subscription resource. In the present specification, the scheduling information may be referred to as reachability schedule information.

In the present specification, the term "reachable" may refer to a state in which a message can be transmitted and received between nodes, and the term "unreachable" or "non-reachable" may refer to a state in which a message cannot be transmitted and received between nodes. Further, if a specific node is in a reachable state, the specific node may be referred to as in a reachable mode. And, if a specific node is in a non-reachable state, the specific node may be referred to as in a non-reachable mode. Thus, reachability scheduling information may indicate a time in which a message transmission and reception can occur between nodes. Further, a connection state between nodes may be referred to as reachability.

A scheduling resource (e.g. <schedule>) may have various attributes. For example, the scheduling resource may include attributes such as resourceType, resourceID, parented, expirationTime, creationTime, lastModifiedTime (see Table 3). In Table 3, RW/RO/WO indicates read/write permission of the corresponding attribute, and may correspond to one of READ/WRITE (RW), READ ONLY (RO), or WRITE ONLY (WO).

And, in Table 3, a multiplicity indicates the number of occurrence of a corresponding attribute in the <schedule> resource. Table 3 is just an example. An attribute of a subscription resource may be configured in a manner of being different from Table 3.

For example, a scheduling resource may include an attribute for scheduling time information (e.g. scheduleElement). The attribute for scheduling time information may represent a time defined by second, minute, hour, day, month, year, and etc. And the attribute for scheduling time information may represent a repetition of time, and may be represented by a wildcard (e.g. '*'). The attribute for scheduling time information may indicate a time duration in which a specific node is in a reachable mode, or may indicate a time duration in which the specific node is in a non-reachable mode. For example, in the case that the attribute for scheduling time information indicates the time duration in which a specific node is in a reachable mode, the corresponding node can transmit and receive a message during the time duration specified by the attribute for scheduling time information, and may be in a connected state with the other nodes. As another example, in the case that the attribute for scheduling time information indicates the time duration in which a specific node is in a non-reachable mode, the corresponding node cannot transmit and receive a message during the time duration specified by the attribute for scheduling time information, and may be in a connectionless state with the other nodes.

Referring to FIG. 9, device 1 910 may perform a procedure shown in FIG. 9 to subscribe to a specific resource of device 2 920. Device 1 910 may or may not correspond to a target receiving a notification according to change of a subscription target resource. In an example of FIG. 9, the specific resource may correspond to the subscription target resource, and, since device 2 920 includes the subscription target resource, device 2 920 may correspond to a hosting device (or an entity).

TABLE 3

| Attributes | Multiplicity | RW/RO/WO | Description |
| --- | --- | --- | --- |
| resourceType | 1 | RO | Resource Type |
| resourceID | 1 | WO | This attribute is an identifier for resource that is used for 'non-hierarchical URI method' od 'IDs based method cases. |
| parentID | 1 | RO | The system shall assign the value to this attribute according to the parameters given in the CREATE Request. |
| expirationTime | 1 | RW | Time/date after which the resource will be deleted by the hosting CSE. This attribute can be provided by the Originator, and in such a case it will be regarded as a hint to the hosting CSE on the lifetime of the resource. |
| creationTime | 1 | RO | Time/date of creation of the resource. |
| lastModifiedTime | 1 | RO | Last modificaton time/date of the resource. |
| labels | 0..1 | RO | The attribute contains a list of identifiers (either an ID or a URI depending if it is a local resource or not) of an <accessControlPolicy> resource. The privileges defined in the <accessControlPolicy> resource that are referenced determine who is allowed to access the resource containing this attribute for a specific purpose (e.g. Retrieve, Update, Delete. etc.). |
| announceTo | 0..1 | RW | This attribute may be included in a CREATE or UPDATE Request in which case it contains a list of URIs/CSE-IDs which the resource being created/updated shall be announced to. |
| announcedAttribute | 1 | RW | This attributes shall only be present at the original resource if some Optional Announced (OA) type attributes have been announced to other CSEs. This attribute maintains the list of the announced Optional Attributes (OA type attributes) in the original resource. Updates to this attribute will trigger new attribute announcement if a new attribute is added or de-announcement if the existing attribute is removed. |
| scheduleElement | 1 (L) | RW | Expresses time periods defined by second, minute, hour day of month, month, and year. Supports repeating periods, and wildcards expressed as a list. |

In step S902, device 1 910 may transmit a request for a subscription resource to device 2 920 to subscribe to a specific resource. For example, the request for subscription resource may correspond to one of a creation request of subscription resource, a retrieval request of subscription resource, a deletion request of subscription resource, or an update request of subscription resource. Each request may have a form of a request message according to the request-response scheme described with reference to FIG. 7. For example, if the request in step S902 corresponds to a creation request, a request for a subscription resource may include op information including C (Create), cn information including attribute information (e.g., notificationURI, filter-Criteria, expirationTime, and the like) of the subscription resource, fr information including identification information of device 1 910, and/or to information including identification information of device 2 920. In another example, if the request in step S902 corresponds to a deletion request or an update request, a request for a subscription resource may include all or a part of information described with reference to FIG. 7.

In step S904, device 2 920 validates whether a request for a subscription resource is capable of being processed, and process the request if the request is capable of being processed. For example, if device 2 920 receives a creation request, device 2 920 validates whether a subscription target resource designated in the to information is subscribable, whether an originator (e.g., 910) of the request has RETRIEVE permission for the subscription target resource, whether the originator (e.g., 910) of the request has access right for sending a notification to an entity or a device designated by address information (e.g. notificationURI) of the subscription resource if the address information (e.g. notificationURI) of the subscription resource does not indicate the originator (e.g., 910) of the request, and whether a hosting device or an entity (e.g., 920) has access rights for sending a notification to an entity or a device designated by the address information (e.g. notificationURI) of the subscription resource. If the aforementioned conditions are all satisfied, device 2 920 may create a subscription resource under a subscription target resource designated by to information.

In another example, if device 2 920 receives a deletion request, device 2 920 validates whether the originator (e.g., 910) of the request has DELETE permission. If the aforementioned condition is satisfied, device 2 920 deletes a subscription resource.

In step S906, device 2 920 may send a response message to device 1 910 after a request for a subscription resource is processed. The response message of step S906 may have a form identical/similar to the response message described with reference to FIG. 7. And, in case of the retrieval request, the response message may include information to be returned.

Figure 10:
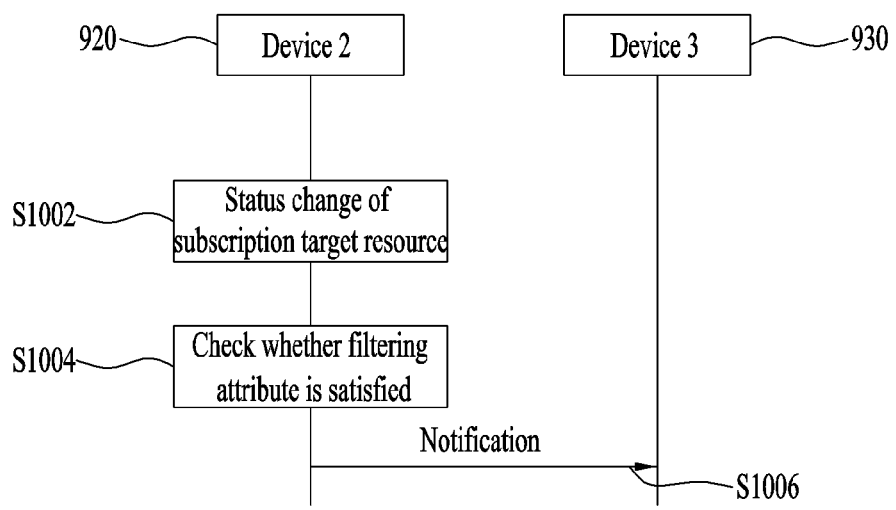
FIG. 10 illustrates an example of a notification procedure.

FIG. 10 illustrates an example of a notification procedure. In the procedure for notification, an originator may correspond to a device or an entity (e.g., 920) hosting a subscription resource. And, a receiver may correspond to a device (or an entity) indicated by address information (e.g., notificationURI) configured in the subscription resource. Specific policy information may be configured for the procedure for notification. The originator may be configured to send a notification message (e.g., NOTIFY) when the policy information is satisfied.

The notification message corresponds to a message triggered by a subscription resource. If change of a subscription target resource that includes the subscription resource as its child resource satisfies a filtering attribute (e.g. notificationCriteria) configured in the subscription resource, the notification message may be transmitted to a receiver indicated by the address information (e.g., notificationURI) configured in the subscription resource. The receiver of the notification message may or may not correspond to a device or an entity which has created/configured the subscription resource. For example, device 1 910 may be identical to device 3 930 or may be different from device 3 930. The notification message may include information described in the following.

fr: identification information or ID of originator (e.g., 920)

to: address information configured in subscription resource (e.g., notificationURI)

cn: data representing modified content of subscription target resource and/or subscription reference information (e.g., URI of the subscription resource) which has created the notification message and/or other additional information Referring to FIG. 10, in step S1002, originator 920 may detect/sense a change of a subscription target resource. The subscription target resource corresponds to a parent resource of a subscription resource. If a resource or an attribute located at a same level as that of the subscription resource under the subscription target resource is modified/changed, originator 920 (e.g., SUB CSF or CSE, refer to FIG. 3) may recognize it as a change of the subscription target resource. If a change of the subscription target resource is detected/sensed, an event may be generated.

If the change of the subscription target resource is detected, in step S1004, originator 920 checks whether the change is matched with a specific attribute (e.g., notificationCriteria) configured in the subscription resource. For example, the specific attribute may include at least one attribute among the attributes shown in the example of Table 2. If the change of the subscription target resource does not satisfy any condition included in the filtering attribute, originator 920 may ignore the change.

If the change of the subscription target resource satisfies all conditions included in the filtering attribute, in step S1006, originator 920 may transmit a notification message to entity 930 indicated by address information (e.g., notificationURI) configured in the subscription resource. For example, the notification message in step S1006 may include identification information of originator 920, data representing modified content of the subscription target resource, and/or subscription reference information which has created the notification message. If the change of the subscription target resource does not satisfy any of conditions included in the filtering attribute, originator 920 may not transmit a generated notification message.

Figure 11:
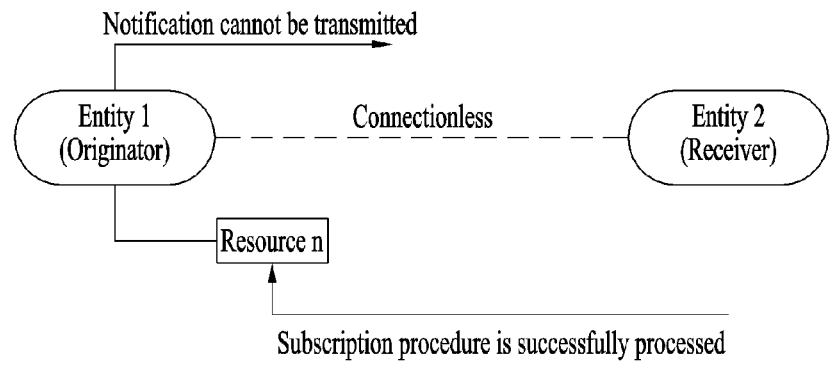
FIG. 11 and FIG. 12 illustrate examples of a subscription and notification procedure in an environment in which a connection state is not ensured.

FIG. 11 illustrates an example of a subscription and notification procedure in an environment in which a connection state is not ensured. In this example of FIG. 11, it is assumed that subscription and notification procedure occurs when two entities (e.g., entity 1 and entity 2) are configured.

As described with reference to FIGS. 9 and 10, when a connection state between the two entities is ensured, a subscription service may be performed as follows.

1. Entity 2 may perform a subscription procedure for a specific resource (e.g., "resource n"). Through this procedure, entity 2 may configure a subscription resource for the specific resource (e.g., "resource n").

2. Entity 1 may monitor the specific resource (e.g., "resource n") for which a subscription resource has been configured, and when the monitored resource is changed, entity 1 may transmit a notification message indicating the resource change to entity 2.

As described above, the notification message may be transmitted to an address (e.g., Contact attribute in ETSI M2M, notificationURI attribute in oneM2M) configured in the subscription procedure. In this example, for convenience of description, it is assumed that a subscriber of the subscription procedure and a receiver of a notification procedure are the same.

Referring to FIG. 11, even if the subscription procedure is successfully performed, a connection state between entities may not be ensured due to network failure, equipment failure, reachability schedule, and so on. The notification message that is generated in the aforementioned environment cannot be transmitted to a receiver (e.g., entity 2) from an originator (e.g., entity 1). Accordingly, in order to process a notification messages that is generated when a connection state is not ensured in the prior art, the generated notification messages may be temporally stored and then may be transmitted to a receiver when a connection is recovered, as illustrated in FIG. 12.

Figure 12:
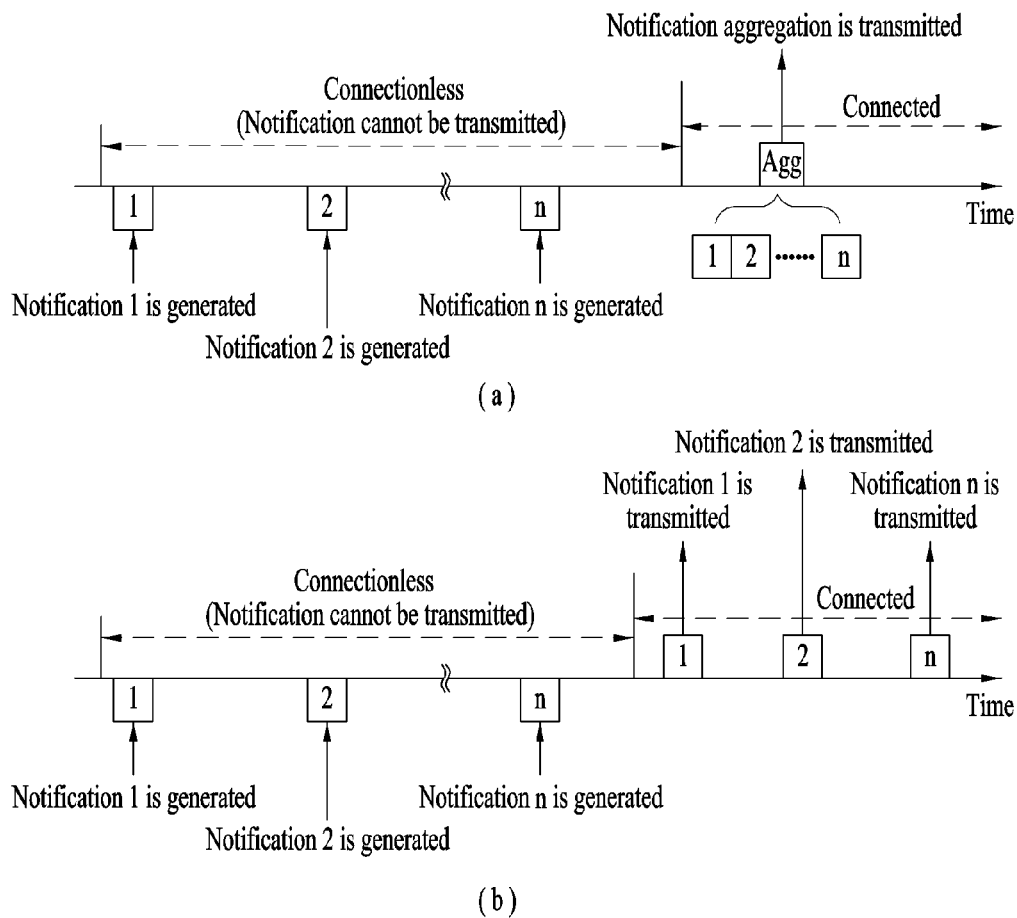

FIG. 12 illustrates an example of a method for transmitting a message to a receiver when a connection is recovered.

For example, referring to FIG. 12(a), when notification 1 to notification n are generated while a connection state is not ensured and then a connection is recovered, the originator may transmit notification aggregation of the generated notification 1 to notification n at a time.

As another example, referring to FIG. 12(b), when notification 1 to notification n are generated while a connection state is not ensured and then a connection is recovered, the originator may sequentially transmit the generated notification 1 to notification n to the receiver one by one.

When a message is transmitted after a connection is recovered as illustrated in FIG. 12, the following issues may occur. First, a notification message transmitted after a connection is recovered may not be needed in terms of the receiver. For example, in a situation in which a specific user is served with respect to a temperature within a room, a connection between entities is disconnected for a specific time (e.g., from 1 pm to 3 pm) and then a connection is recovered. In this example, data that a user wants at a time point when a connection is recovered may be newest data after 3 pm or may be data for recent 30 minutes. When the method illustrated in FIG. 12 is used, the user needs to receive all data items generated during the time when a connection state is not ensured. According to this method, unnecessary messages are transmitted and received in terms of the receiver as well as the originator, and thus data transmission efficiency may be degraded and overall performance of the system may be degraded.

In addition, a notification message generated in an environment in which a connection state is not ensured may not be selectively processed. For example, it is assumed that a user configured generation of an emergency message at a specific temperature (e.g., 30 degrees) or more as well as in a room temperature state. When the method illustrated in FIG. 12 is used, priorities of all notification messages are set to be the same, and thus even if an important message is present among messages generated during a connectionless state, there is no method for preferentially processing the important message.

Accordingly, the present invention proposes attributes and transmission algorithm for selectively processing a notification message that is generated during time when devices are connectionless. Although examples according to the present invention are described in terms of a M2M environment, the present invention may be applied to another system having a client-server (or originator-receiver) structure in the same or similar way.

In the specification, for the subscription procedure, a subscriber may refer to an entity requesting subscription and a hosting entity may refer to an entity having a resource to be monitored (or a subscription target resource). In addition, for the notification procedure, an originator may refer to an entity transmitting a notification message and a receiver may refer to an entity that lastly receives a notification message. The hosting entity in the subscription procedure and the originator in the notification procedure may be the same.

In the specification, the case in which a connection state is not ensured may include the case in which the originator cannot transmit the generated notification message to the receiver and may be referred to as a connectionless state. The case in which a connection state is not ensured may occur due to various reasons such as network failure, equipment failure, and reachability schedule. The case in which a connection state is ensured may refer to a case in which the originator can normally transmit the generated notification message to the receiver and may be referred to as a state having a connection or a connected state. In addition, in the specification, the connection state may be referred to as reachability.

First, the present invention proposes attributes of a subscription resource.

Attribute Information for Notification Action

The present invention proposes attribute information indicating a notification policy of an originator when a connection state is not ensured. The attribute information indicating the notification policy of the originator may be referred to as pendingNotification as a non-limiting example. The attribute information indicating the notification policy of the originator may be configured as one attribute of a subscription resource. Accordingly, the attribute information indicating the notification policy of the originator may be used in a subscription/notification procedure together with attribute information items shown in Table 1. For convenience of description, in the specification, attribute information indicating a notification policy of an originator may be referred to as notification policy information or first attribute information.

The notification policy information (e.g., pendingNotification attribute) may indicate an action to be performed by an originator on a notification message during a non-reachable period. For example, the non-reachable period may be determined according to scheduling information indicated by a scheduling resource or a reachability scheduling resource (see the description associated with FIG. 9). When notification policy information (e.g., pendingNotification attribute) is configured in a subscription resource, notification(s) that occur and is pending during a non-reachable period may be processed. Table 4 below shows notification policy information (e.g., pendingNotification attribute).

TABLE 4

| Attribute Name | Multiplicity | RW/RO/WO | Description |
|---|---|---|---|
| pendingNotification | 0..1 | RW | This notification policy, if set, indicates how missed notifications due to a period of connectivity (according to the reachability and notification schedules). The possible values for pendingNotification are:<br>"sendNone"<br>"sendLatest"<br>"sendAllPending"<br>"sendManual" |

TABLE 4-continued

| Attribute Name | Multiplicity | RW/RO/WO | Description |
|---|---|---|---|
| | | | This policy depends upon caching of retained notifications on the hosted CSE. |

In Table 4 above, RW/RO/WO may refer to permission of read/write of the corresponding attribute and may be one of READ/WRITE(RW), READ ONLY(RO), and WRITE ONLY(WO). In addition, in Table 4, multiplicity may refer to a number of occurrences of the corresponding attribute in a <subscription> resource. In this example of Table 4 above, since the multiplicity of notification policy information (e.g., pendingNotification attribute) is 0 or 1, the notification policy information (e.g., pendingNotification attribute) may be optionally included in the subscription resource. In addition, both read/write may be permitted.

As shown in Table 4 above, the notification policy information (e.g., pendingNotification attribute) may have four kinds of values. According to a value set in the notification policy information (e.g., pendingNotification attribute), the originator may process a notification message generated while a connection state is connectionless as follows. When there is no separate setting, for example, sendNone among the four values may be set to a default value. In the specification, sendNone may be referred to as a first value, sendLatest may be referred to as a second value, sendAllPending may be referred to as a third value, and sendManual may be referred to as a fourth value.

(1) When Notification Policy Information is Set to sendNone

The originator may not store all notification messages that are generated for time when a connection state is not ensured. In this case, all notification messages that are generated for time when a connection state is not ensured may be discarded (rather than being transmitted). Since there is no stored notification message when reachability is recovered, the originator does not need to transmit the notification message that is generated for time when a connection state is not ensured. This setting may be used when a pending notification message is not required. For example, this setting may be used in an application service for monitoring a current room temperature.

Figure 13:
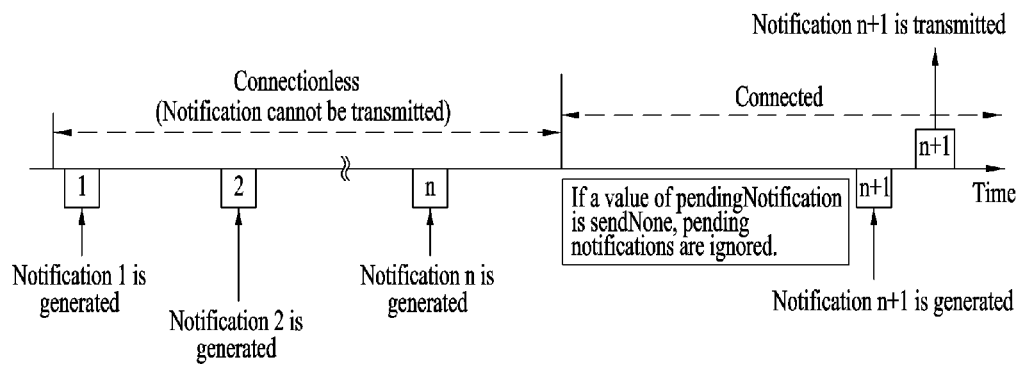
FIG. 13 to FIG. 16 illustrate notification methods according to notification policy information.

FIG. 13 illustrates a notification method when notification policy information (e.g., pendingNotification attribute) is set to sendNone.

Referring to FIG. 13, notification 1 to notification n may be generated according to changes in a subscription resource while a connection state is not ensured, and in this regard, when a connection state between an originator and a receiver is connectionless, a notification message cannot be transmitted to the receiver from the originator. In this case, the generated notification messages may be processed according to notification policy information (e.g., pendingNotification attribute). In this example, since the notification policy information (e.g., pendingNotification attribute) is set to sendNone, all notification messages that are generated when a connection state is not ensured are ignored and are not stored. Accordingly, the notification message is not transmitted even after a connection is recovered. However, when a notification message (e.g., notification n+1) is generated in a connected state, the notification message may be transmitted to the receiver.

(2) When Notification Policy Information is Set to sendLatest

The originator may store only a most recently generated message among notification messages generated for time when a connection state is not ensured. In this case, a previously stored notification message may be deleted. That is, the originator may store a new notification message and discard the remaining notification messages. The originator may transmit a most recently stored notification message to the receiver when reachability is recovered. This setting may be used when a most recently generated notification message among pending notification messages is required. For example, the setting may be applied to an application service for receiving a report in relation to device update. In addition, when the notification policy information (e.g., pendingNotification attribute) is set to sendLatest, an ec value of the notification message may be set to 'latest' (see the description related to FIG. 7).

Figure 14:
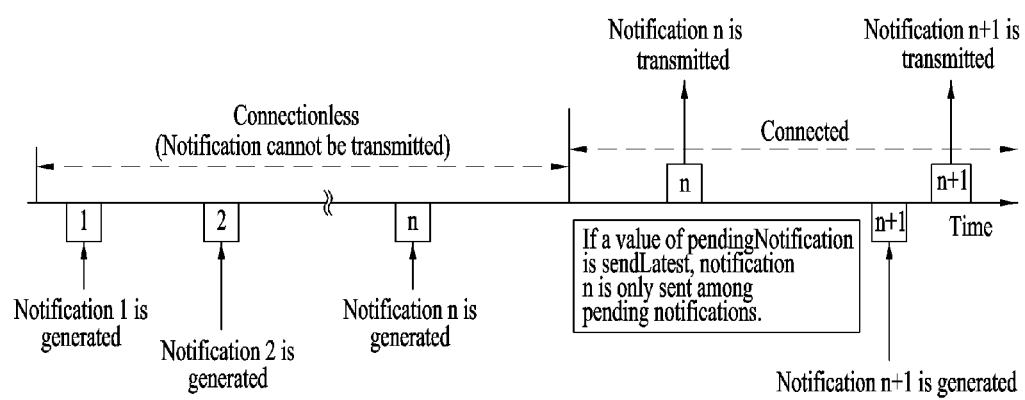

FIG. 14 illustrates a notification method when notification policy information (e.g., pendingNotification attribute) is set to sendLatest.

Referring to FIG. 14, notification 1 to notification n may be generated according to changes in a subscription resource while a connection state is not ensured, and in this regard, when a connection state between an originator and a receiver is not ensured, a notification message cannot be transmitted to the receiver from the originator. In this case, the generated notification messages may be processed according to notification policy information (e.g., pendingNotification attribute). In this example, since the notification policy information (e.g., pendingNotification attribute) is set to sendLatest, a most recently generated message (e.g., notification n) among notification messages generated when a connection state is not ensured may be stored. In addition, when another message is generated for time when a connection state is not ensured, a newly generated message may be stored and a previously stored message may be discarded. Needless to say, when a notification message (e.g., notification n+1) is generated in a connected state, the notification message may be transmitted to the receiver.

(3) When Notification Policy Information is Set to sendAllPending

The originator may store notification messages that are generated during time when a connection state is not ensured. In this case, the transmitted notification message may be differently determined according to an amount that can temporally stored by the originator. When reachability is recovered, the originator may transmit all the stored notification messages to the receiver. This setting may be used when all the generated notification messages are required. For example, the setting may be used in an application service (vehicle black box) that requires statistic data or data analysis.

Figure 15:
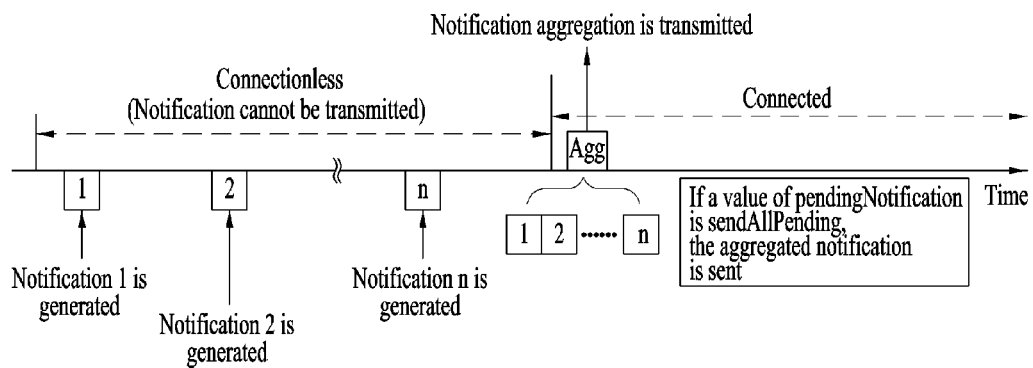

FIG. 15 illustrates an example of a notification method when notification policy information (e.g., pendingNotification attribute) is set to sendAllPending.

Referring to FIG. 15, notification 1 to notification n may be generated according to changes in a subscription resource while a connection state is not ensured, and in this regard, when a connection state between an originator and a receiver is connectionless, a notification message cannot be transmitted to the receiver from the originator. In this case, the generated notification messages may be processed according to notification policy information (e.g., pendingNotification attribute). In this example, since the notification policy information (e.g., pendingNotification attribute) is set to sendAllPending, messages generated while a connection state is not ensured may be stored. In addition, all stored messages may be transmitted to the receiver after a connection is recovered. In the method of FIG. 15, all the generated notification 1 to notification n are stored, and thus an aggregation of all the stored messages may be transmitted to the receiver. Needless to say, when a notification message (e.g., notification n+1) is generated in a connected state, the notification message may be transmitted to the receiver.

(4) When Notification Policy Information is Set to sendManual

The originator may store notification message(s) that is arbitrarily set by a subscriber among all notification messages generated during time when a connection state is not ensured. In this case, a criteria of arbitrary setting may be, for example, time (e.g., 11 o'clock to 12 o'clock), designation of a specific notification message (e.g., 10 notification messages from time point when connection is disconnected), and the like. This setting may be used when an arbitrary criteria of a subscriber is configured for the case in which messages cannot be processed according to the aforementioned sendNone, sendLatest, and sendAllPending. For example, the setting may be used in a monitoring application service for requesting a notification message generated between 18 o'clock and 06 o'clock.

Figure 16:
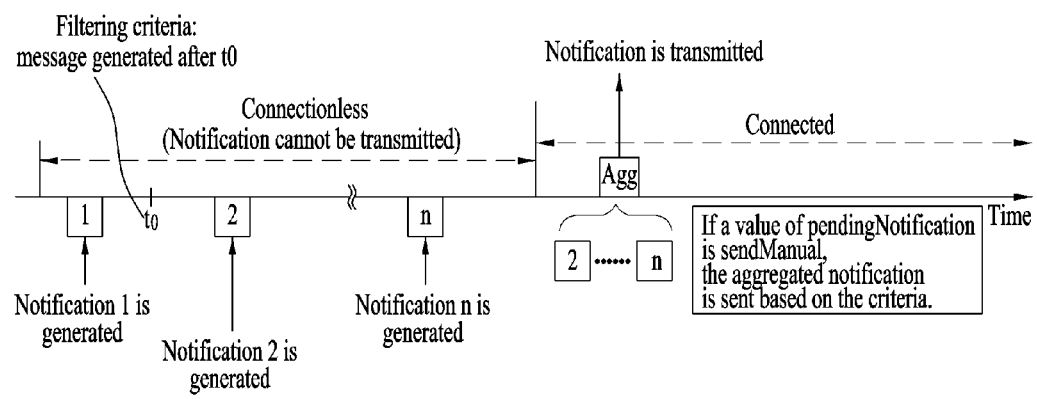

FIG. 16 illustrates a notification method when notification policy information (e.g., pendingNotification attribute) is set to sendManual.

Referring to FIG. 16, notification 1 to notification n may be generated according to changes in a subscription resource while a connection state is not ensured, and in this regard, when a connection state between an originator and a receiver is not ensured, a notification message cannot be transmitted to the receiver from the originator. In this case, the generated notification messages may be processed according to notification policy information (e.g., pendingNotification attribute). In this example, since the notification policy information (e.g., pendingNotification attribute) is set to sendManual, only notification messages that satisfy a criteria among messages generated while a connection state is not ensured may be stored. In addition, only the stored messages may be transmitted to the receiver after a connection is recovered. In the example of FIG. 16, the criteria is associated with time and indicates notification messages generated after to, and thus notification 2 to notification n that are generated after to may be stored and then transmitted to the receiver after a connection is recovered. In this case, an aggregation of notification messages may be transmitted to the receiver based on the criteria.

Attribute Information for Notification Priority (or Notification Category)

In addition, the present invention proposes attribute information (e.g., notificationEventCat attribute) for configuring priority of a notification message generated by an originator. In the specification, the attribute information (e.g., notificationEventCat attribute) for configuring the priority of the notification message may be referred to as notification priority information or second attribute information. The notification priority information may be configured by a subscriber and represented as an arbitrary value n (e.g., n=level-1, level-2, . . . , level-n). The priority of the notification message may be divided into a specific number of event categories and configured based on the event categories, and thus may be determined according to a corresponding event category. Accordingly, the priority of the notification message may indicate a category of the generated event or message and may be referred to as an (event) category. Accordingly, the notification priority information (e.g., notificationEventCat attribute) may define an (event) category for a notification message triggered by a subscription resource. In addition, the notification priority information may indicate an event category to be included in the notification message in order to accurately handle the notification message by the receiver. The notification priority information may be used in connection with pre-defined policy information of a specific system.

The notification priority information (e.g., notificationEventCat attribute) may be configured as one attribute of a subscription resource. Accordingly, attribute information indicating a notification policy of the originator may be used in a subscription/notification procedure together with or separately from attribute information items shown in Table 1 above. In addition, notification priority information (e.g., notificationEventCat attribute) may be configured by a subscriber.

For example, the notification priority information (e.g., notificationEventCat attribute) may be defined as 'High (high priority)', 'Medium (medium priority)', or 'Low (low priority)'. In this case, when a specific notification message configured as high priority is generated among notification messages, the generated message may be a notification message that satisfies notificationEventCat='High'. The corresponding notification message may be preferentially processed as compared to other notification messages. Table 5 below shows notification priority information (e.g., notificationEventCat attribute) according to the present invention.

TABLE 5

| Attribute Name | Multiplicity | RW/RO/WO | Description |
| --- | --- | --- | --- |
| notificationEventCat | 0..1 | RW | Indicates the Event Categories for the notification message triggered by the <subscription> resource. This notification policy indicates the subscriber's requested event category to be used for notification messages generated by this subscription. |

In the example of Table 5 above, multiplicity of notification priority information (e.g., notificationEventCat attribute) is 0 or 1, and thus notification priority information (e.g., notificationEventCat attribute) may be optionally included in a subscription resource. In addition, both read/write may be permitted.

Figure 17:
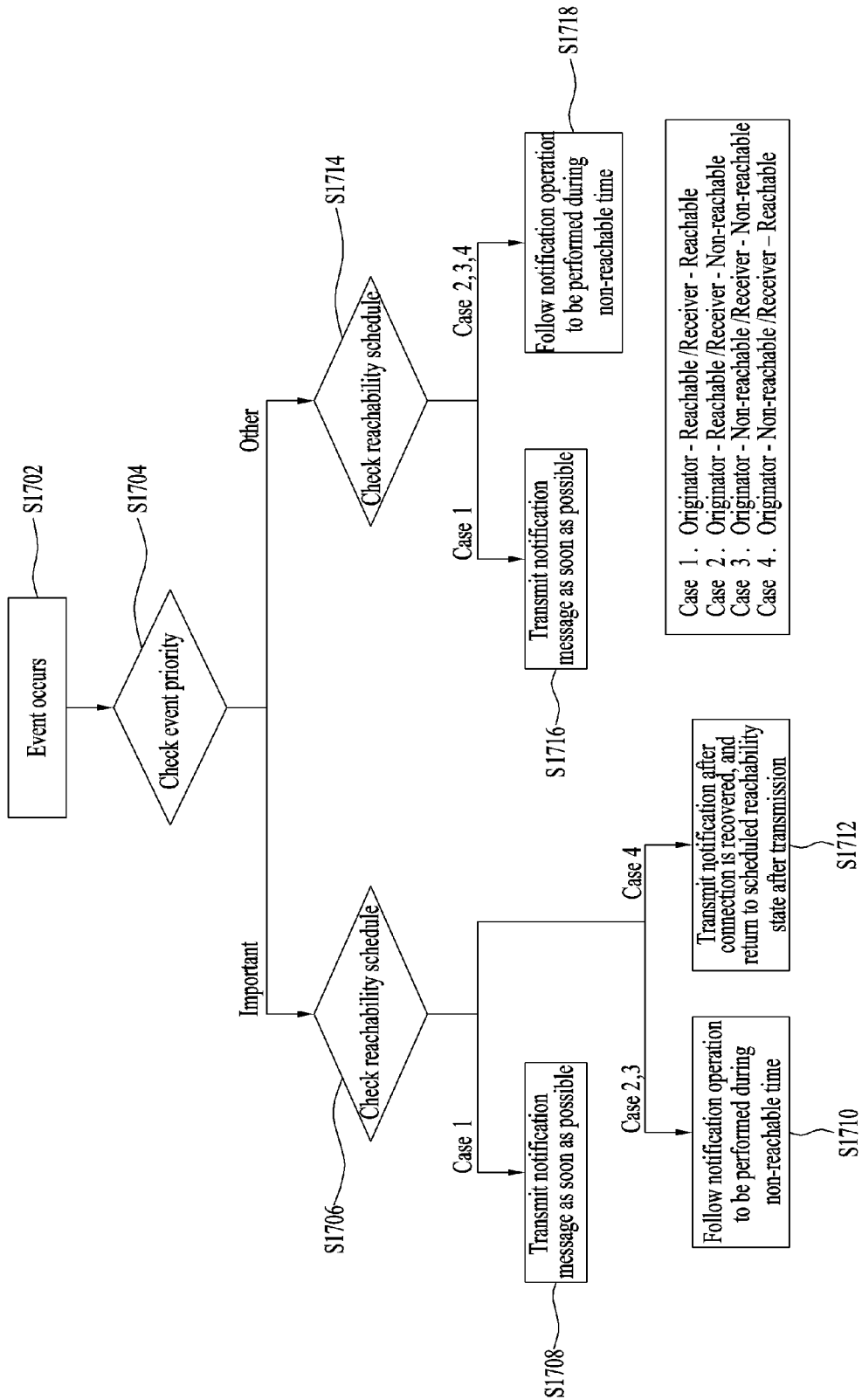
FIG. 17 illustrates a notification procedure according to the present invention.

FIG. 17 illustrates a notification procedure according to the present invention. In an example of the notification procedure according to the present invention, a notification message may be transmitted in consideration of attribute information proposed according to the present invention.

As described above, a connection state between entities may not be ensured for the reason that may be classified into network failure, equipment failure, reachability schedule, etc. When connection is disconnected due to network failure and equipment failure, there is no method for normally recovering the connection. However, when a connection is disconnected due to reachability schedule, an entity (e.g., originator) may change a connection state and then transmit the generated message. Accordingly, according to the present invention, when a connection state has been determined as being disconnected due to reachability schedule during a notification procedure for subscription, the connection state may be resolved using attribute information (e.g., notification policy information (e.g., pendingNotification attribute) and/or notification priority information (e.g., notificationEventCat attribute)) according to the present invention.

According to the present invention, a subscription procedure is assumed to be successfully performed. That is, according to the present invention, attribute information items (e.g., notification policy information (e.g., pendingNotification attribute) and/or notification priority information (e.g., notificationEventCat attribute)) may be assumed to be configured in the subscription procedure.

As described above, a reachable mode and non-reachable mode stated in the present invention may be defined as follows. The reachable mode may refer to a state in which a corresponding entity can be connected to another entity or can transmit and receive a message by normal operations. The non-reachable mode may refer to a state in which a corresponding cannot be connected to another entity or cannot transmit and receive a message to and from another entity because there is a limitation in an operating state of the corresponding entity. For example, there may be the reachable mode or the non-reachable mode due to an issue in terms of a battery and so on in a sensor network environment.

Referring to FIG. 17, in operation S1702, when a resource (or a subscription target source) configured with a subscription procedure is changed, an event may be generated. The event may occur when change in the subscription target source is detected/sensed. A subscription resource may be pre-configured as a child resource of a subscription target resource in order to generate the event.

In operation S1704, the originator may check priority of the generated event. In this case, the originator may check the priority of the generated event based on notification priority information (e.g., notificationEventCat attribute) (see the description related to Table 5). For example, the case in which priority is high may include the case in which notificationEventCat is set to an 'immediate' value. As another example, the case in which priority is not high may include the case in which notificationEventCat is set to a value (e.g., bestEffort) except for the 'immediate' value.

The originator may check priority of an event and then, for example, an ec value of the notification message may be set to a value indicated by the notification priority information (e.g., notificationEventCat attribute). In addition, when priority of the generated event is checked, at least one of other attributes (e.g., see Table 1) and/or conditions (e.g., see Table 2) configured for a subscription resource other than notification priority information (e.g., notificationEventCat attribute) may be used together. After a procedure associated with attribute for event processing is complete, a notification message may be generated. In this case, since the notification message is generated by event(s), an event category may be the same as priority of the notification message.

After checking event priority in operation S1704, the originator may proceed to operation S1706 or S1714 according to the event priority. In operation S1704, when the event priority is high, the originator may proceed to operation S1706, and in operation S1704, when the event priority is not high, the originator may proceed to operation S1714.

In operation S1706 or S1714, the originator may check/determine a connection state of the originator and counterpart entity (or a receiver). The connection state (or a reachability mode) of the originator and receiver may be determined based on a scheduling resource (or scheduling information set therein) for each entity or device.

Specific entities (e.g., Bluetooth device) may flexibly configure a connection state due to the reason such as battery consumption. Accordingly, in operation S1706 or S1714, the originator may check whether connection states of the originator and the receiver are in a reachable mode or a non-reachable mode. When there is no information for checking a state of a corresponding entity, the originator may determine that the corresponding entity is in a reachable mode.

For example, the originator may check scheduling information (or reachability schedule information) through a scheduling resource and check/determine a connection state (or a reachability mode) through scheduling information of a corresponding entity. The scheduling resource for the originator may be configured as a child resource (e.g., notificationSchedule resource) of a subscription resource. The scheduling resource of the receiver may be configured as a separate scheduling resource. As described above, a scheduling resource (e.g., <schedule> or notificationSchedule resource) may include scheduling information (or attribute (e.g., scheduleElement) for scheduling time information) which may be associated with operations of corresponding entities (detailed time such as a year, a month, a day, a minute, and a second, a repetition period, or the like) (see the description related to FIG. 9). Accordingly, the originator may check a reachable or non-reachable mode (and/or time duration) using scheduling information (or attribute (e.g., scheduleElement) for scheduling time information) configured in each scheduling resource. For example, according to a result obtained by checking a scheduling resource (e.g., notificationSchedule resource) configured as a child resource of a subscription resource by the originator, when the scheduling resource corresponds to time duration indicated by scheduling information included in the scheduling resource and indicates reachable time duration by the scheduling resource, the originator may be determined to be reachable. As another example, according to a result obtained by checking a scheduling resource (e.g., <schedule> resource) configured separately by the originator, when the scheduling resource may corresponds to time duration indicated by scheduling information included in the scheduling resource and indicates reachable time duration by the scheduling resource, the receiver may be determined to be reachable. As a similar method, whether the originator or the receiver is non-reachable may be determined.

A connection state between entities may be classified into four cases as follows.

Case 1—both an originator and a receiver are in a reachable mode.

Case 2—an originator is in a reachable mode and a receiver is in a non-reachable mode.

Case 3—both an originator and a receiver are in a non-reachable mode.

Case 4—an originator is in a non-reachable mode and a receiver is in a reachable mode.

Only Case 1 among the 4 cases may indicate that there is a connection state present between entities and the remaining cases (Cases 2, 3, and 4) may indicate that a connection state is connectionless due to a non-reachable mode configured in both or one of the originator and the receiver.

In operation S1706, when a generated notification message satisfies a condition "important message" and it is determined that a connection state is connectionless (i.e., Case 1—both an originator and a receiver are in a reachable mode), the original and the receiver may each proceed to operation S1708. Since this case means that there is a connection between two entities, and thus the originator may immediately transmit the generated notification message to the receiver. In this case, the generated notification message is an important message, and thus the corresponding message may be preferentially processed compared with other messages.

For example, when a value for preferentially processing a notification message in notification priority information (e.g., notificationEventCat attribute) is 'immediate', a condition "important message" may refer to a notification message with an ec value of the notification message configured as 'immediate'. The 'immediate' may be merely an example and the condition "important message" may be represented as another value. For example, when notification priority information (e.g., notificationEventCat attribute) is defined as 'High (high priority)', 'Medium (medium priority)', or 'Low (low priority)', the condition "important message" may refer to a notification message with an ec value of a notification message configured as 'High'.

In operation S1706, when the generated notification message satisfies the condition "important message" and a connection state is connectionless (that is, Case 2—an originator is in a reachable mode and a receiver is in a non-reachable mode/Case 3—both an originator and a receiver are in a non-reachable mode), the originator and the receiver may proceed to operation S1710.

In operation S1710, even if the generated notification message is an important message, a notification message generated when a connection state between two entities is connectionless cannot be transmitted. Accordingly, in operation S1710, the originator may process notification messages that are generated while a connection state is connectionless, according to a specific operation (e.g., according to a value set in notification policy information (e.g., pendingNotification attribute)) configured for the generated notification messages. The notification message that is processed according to the notification policy information (e.g., pendingNotification attribute) may be transmitted to the receiver after a connection with the receiver is recovered (refer to the description of Table 4). In this case, the generated notification message is an important message, and thus may be preferentially processed as compared to other messages.

In operation S1706, when the generated notification message satisfies the condition "important message" and a connection state is connectionless (Case 4—an originator is in a non-reachable mode and a receiver is in a reachable mode), the originator and the receiver may proceed to operation S1712.

In operation S1712, even if the generated notification message is an important message, the notification message generated when a connection state between two entities is connectionless cannot be transmitted. However, unlike in operation S1710, there is no connection in operation S1712 because of a non-reachable mode configured for only an originator side. Accordingly, in operation S1712, in order to preferentially transmit a corresponding notification message, the originator may temporally convert a state of the originator to a reachable mode from a non-reachable mode. After the connection is temporally recovered by the originator, the originator may transmit the generated notification message to the receiver, and then after the transmission is terminated, the state of the originator may be converted to an originally configured connection state (i.e., non-reachable mode) of a device.

When the notification message generated in operation S1704 does not satisfy the condition "important message" and it is determined that there is a connected state in operation S1714 (i.e., Case 1—both an originator and a receiver are in a reachable mode), the originator and the receiver may proceed to operation S1716.

In operation S1716, since two entities are in a connected state, the originator may immediately transmit the generated notification message to the receiver. In this case, priority of the generated notification message may be relatively low, and accordingly, the notification message may be processed in a low priority order.

For example, when a value for preferentially processing a notification message in notification priority information (e.g., notificationEventCat attribute) is 'immediate', the case in which the condition "important message" is not satisfied may refer to a notification message with an ec value of the notification message configured as a value except for 'immediate'. The 'immediate' may be merely an example and the condition "important message" may be represented as another value. For example, when the notification priority information (e.g., notificationEventCat attribute) is defined as 'High (high priority)', 'Medium (medium priority)', or 'Low (low priority)', if the condition "important message" is not satisfied, an ec value of the notification message may be set to 'Medium' or 'Low'.

When the notification message does not satisfy the condition "important message" in operation S1704 and it is determined that a connection state is connectionless in operation S1714 (i.e., Case 2—an originator is in a reachable mode and a receiver is in a non-reachable mode/Case 3—both an originator and a receiver are in a non-reachable mode/Case 4—an originator is in a non-reachable mode and a receiver is in a reachable mode), the originator and the receiver may proceed to operation S1718.

In operation S1718, the notification message generated when a connection state between two entities is connectionless cannot be transmitted. Accordingly, in operation S1718, the originator may process notification messages generated while a connection state is connectionless, according to a specific operation (e.g., according to a value set in notification policy information (e.g., pendingNotification attribute)) configured for the generated notification messages (see the description related to Table 4). The notification message that is processed according to the notification policy information (e.g., pendingNotification attribute) may be transmitted to the receiver after a connection with the receiver is recovered. In this case, priority of the generated notification message may be relatively low, and accordingly, the notification message may be processed in a low priority order.

FIG. 18 illustrates a notification procedure according to the present invention. FIG. 18 illustrates a detailed embodiment of an operation of an originator, performed in operation S1712 of FIG. 17.

In the example of FIG. 18, it is assumed that a value indicating "important message" to be preferentially processed by the originator is assumed to be 'immediate' and that a connection state is connectionless for t0 to t3 due to a pre-configured non-reachable mode of the originator. In this case, the receiver may be in a reachable mode. In this condition, when a notification message B (e.g., notificationEventCat='immediate') that satisfies a condition of notification priority among notification messages generated while a connection state is connectionless is generated, the originator may be temporally converted to a reachable mode from a non-reachable mode and may transmit a corresponding notification message at a time point t1. After transmitting the notification message, the originator may be converted to a non-reachable mode from a reachable mode at a time point t2. The connection of the originator may be temporally recovered and a corresponding message may be transmitted only when there is an important message, and the originator may transmit the important message and then may return to a pre-configured connection state.

Meanwhile, a notification message in a notification procedure may be passed through at least one transit entity when being transmitted to a receiver from an originator. Hereinafter, a notification procedure in which three or more entities including an originator, a receiver, and a transit entity participate will be described.

FIG. 19 illustrates an example of a notification procedure. FIG. 19 illustrates an example in which a notification procedure is performed in a system including three devices or entities. It is assumed that entity 3 successfully performs a subscription procedure for a specific resource configured in entity 1 in a situation where the system includes three entities. Accordingly, the specific resource in entity 1 may correspond to a subscribed-to resource and a subscription resource as a child resource of the specific resource may be successfully configured. In this case, a target to which a notification message is transmitted from the subscription resource may be configured as a subscriber (e.g., entity 3) that requested a subscription procedure. The example of FIG. 19 is a non-limiting example and an entity configuring a subscription resource may be an entity different from a subscriber.

In the example of FIG. 19, when any issue does not occur in a procedure for transmitting a notification message, a message generated by entity 1 may be transmitted to entity 2 and entity 2 may relay and transmit the transmitted notification message to entity 3. However, due to various reasons (e.g., hardware specification of an entity itself, delay due to a network state, entity scheduling configured by a specific user, data that is irregularly transmitted from various entities, and disconnection between entities) that occur in an entity or between entities, notification messages may not be immediately processed and may be buffered in, for example, an originator (e.g., entity 1) or a transit entity (e.g., entity 2).

For example, when a notification message is buffered in the originator (e.g., entity 1) (Example 1 of FIG. 19), the notification message may be effectively processed based on notification priority information (e.g., notificationEventCat attribute) and notification policy information (e.g., pendingNotification attribute) according to the present invention (see the description related to FIGS. 13 to 18).

However, the notification messages may not be buffered in an originator (e.g., entity 1) but be buffered in a transit entity (e.g., entity 2) (Example 2 of FIG. 19). For example, there is a connection between the originator (e.g., entity 1) and the transit entity (e.g., entity 2) but a connection state between the transit entity (e.g., entity 2) and the receiver (e.g., entity 3) is connectionless, and thus a notification message transmitted to the transit entity (entity 2) may be buffered in the transit entity (e.g., entity 2). However, unlike the originator, the transit entity (e.g., entity 2) cannot use information such as notification priority information (e.g., notificationEventCat attribute) and notification policy information (e.g., pendingNotification attribute) configured in the subscription resource and thus the same issues as described with reference to FIGS. 11 and 12 may occur.

For example, a connection between entities may be disconnected for one hour, notification messages may be buffered in the transit entity (e.g., entity 2), and all of the buffered notification messages may transmitted to the receiver (e.g., entity 3) after one hour. In this case, data required in terms of the receiver (e.g., entity 3) may be specific data (e.g., a most recently generated notification message, a notification message generated during arbitrary time duration), but when the conventional art is applied, the transmitted notification message may be aggregated notifications buffered in the transit entity (e.g., entity 2). Accordingly, the receiver (e.g., entity 3) may receive notification messages, most of which are unnecessary in terms of the receiver. Accordingly, in case that the conventional art is used in terms of an overall system, unnecessary data may be stored and transmitted and unnecessary traffic and information storage overhead of a resource may be caused. In particular, this may limit a function of subscription and notification procedures in a M2M system that is complexly configured with numerous entities. Accordingly, the present invention proposes a method for effectively transmitting a notification message.

As described above, the examples according to the present invention have been described in terms of a M2M environment but can be applied to other systems with a client-server (or originator-receiver) structure in the same/similar way. In the specification, for the subscription procedure, the subscriber may refer to an entity that requests subscription and the hosting entity may refer to an entity having a resource to be monitored (or a subscribed-to resource). In addition, for the notification procedure, the originator may refer to an entity that transmits a notification message and the receiver may refer to an entity that lastly receives a notification message. The hosting entity in the subscription procedure and the originator in the notification procedure may be the same entity. In addition, a notification message transmission target in the subscription procedure may be configured as an arbitrary entity, but according to the present invention, for convenience of description, it is assumed that the notification message transmission target is the same entity as a subscriber. In addition, in the specification, the transit entity or the transit device may refer to the remaining entity other than an entity which is the notification message transmission target. The transit entity may transmit a message transmitted from the hosting entity to a next transit entity or the entity which is the notification message transmission target. The transit entity may be referred to as an "interim entity".

The present invention proposes a method for reconfiguring a notification message and then transmitting the notification message to a next entity based on attribute information configured according to a request of an entity (e.g., subscriber) that requests the notification message and based on a state of an entity (i.e., originator or transit entity) that processes the notification message in order to effectively transmit the notification messages buffered in the entity (e.g., originator or transit entity) that transmit the notification message.

The attribute information configured in order to effectively transmit the notification messages may include all attribute information items that are configured for various reasons (e.g., hardware specification of an entity itself, delay due to a network state, entity scheduling set by a specific user, data that is irregularly transmitted from various entities, and disconnection of connection between entities) that may cause buffering by an entity that transmits the notification message. The attribute information configured in order to effectively transmit notification messages may be applied to, for example, notification messages buffered in an entity (e.g., originator or transit entity) that transmits the notification message. In this case, attribute information items configured for the corresponding notification message may be classified into sendNone, sendLatest, sendAllPending, and sendManual (i.e., attributes configured for reasons that may cause buffering in an entity may be set to one value (or an operating level) of sendNone, sendLatest, sendAllPending, and sendManual).

1. sendNone: An entity that transmits a notification message may discard all buffered notification messages. For example, notification messages buffered in the entity may be deleted and then a notification message generated after that may be transmitted.

2. sendLatest: An entity that transmits a notification message may temporally store only a most recently generated message among all buffered notification messages and may transmit the most recently generated notification message to a next entity (e.g., transit entity or receiver).

3. sendAllPending: An entity that transmits a notification message may transmit all buffered notification messages to a next entity (transit entity or receiver) (in this case, the transmitted notification message may be differently determined according to an amount that can be temporally stored by the entity that transmits the notification message.).

4. sendManual: An entity that transmits a notification message may transmit notification message(s) that satisfies a policy that is arbitrarily configured by a subscriber from among buffered notification messages. For example, an arbitrarily configured policy may be time (e.g., after 3 o'clock or from 3 o'clock to 4 o'clock) or designation of a specific notification message (e.g., last three messages among pending notification messages).

As described above, attribute information items according to the present invention may be used to effectively transmit notification messages buffered in the entity (e.g., originator or transit entity) that transmits the notification message.

In the present invention, the attribute information items configured in order to effectively transmit the notification messages may be configured according to notification policy information (e.g., pendingNotification attribute). The attribute information items configured in order to effectively transmit notification messages may be attribute information configured separately from the notification policy information such as attribute information of a subscription resource or may be configured to operate in the same as the notification policy information with reference to the notification policy information (e.g., pendingNotification attribute). When the attribute information is configured separately from the notification policy information (e.g., pendingNotification attribute), the attribute information may be included, for example, as attribute information of "reconnectNotify" or "interimEventNotify" in a subscription resource. The separately configured attribute information (e.g., "reconnectNotify" or "interimEventNotify" attribute) may be set to one value (or operating level) of, for example, sendNone, sendLatest, sendAllPending, or sendManual. When the attribute information for enforcement policy information is not separately configured in a subscription resource and notification policy information (e.g., pendingNotification attribute) according to the present invention is referred to, the description given with reference to Table 4 and FIGS. 13 to 16 may be applied in the same/similar way.

Alternatively, when the attribute information configured in order to effectively transmit the notification message is configured as separate attribute information (e.g., reconnectNotify or interimEventNotify attribute), the originator may use separate attribute information (e.g., reconnectNotify or interimEventNotify attribute) during transmission of the notification message. In this case, the notification policy information (e.g., pendingNotification attribute) may be simultaneously configured, the notification policy information may be applied only to an operation associated with buffering of the generated notification message, and the separate attribute information (e.g., reconnectNotify or interimEventNotify attribute) may be applied when the buffered notification message is transmitted. In this case, the notification policy information (e.g., pendingNotification attribute) and the separate attribute information (e.g., reconnectNotify or interimEventNotify attribute) may be configured to have different values. For example, the notification policy information may be set to sendAllPending and the separate attribute information may be set to sendLatest. In this case, when a notification message are generated while the originator is in a connectionless state, all notification messages may be buffered, but a connection of the originator is recovered, only a most recently stored notification message may be transmitted.

The present invention proposes that an operating level configured with reference to notification policy information (e.g., pendingNotification attribute) or as separate attribute information be included in a notification message and then transmitted with the notification message. In this case, for convenience of description, the operating level included in the notification message may be referred to as enforcement policy information. In addition, the enforcement policy information may refer to information associated with a notification policy to be enforced between a subscription resource hosting entity and a notification target entity.

For example, the enforcement policy information may include a value corresponding to the notification policy information (e.g., pendingNotification attribute) or the separate attribute information (e.g., reconnectNotify or interimEventNotify attribute). In this case, the enforcement policy information may be included in the conventional information defined for the notification message. For example, the enforcement policy information may be included in event category information (e.g., ec, see the description related to FIG. 7) of the notification message and then transmitted. As another example, the enforcement policy information may be included in newly defined information but not previously defined information in the notification message. For example, the enforcement policy information of the notification message may be configured to have a value corresponding to one operating level among sendNone, sendLatest, sendAllPending, and sendManual. For example, assuming the enforcement policy information is set to "sendNone", when an entity that receives the notification message is in a connectionless state, all notification messages that are received during connectionless time duration may be deleted according to an operation "sendNone", and a message generated after a connection is recovered may be first transmitted to a next entity. As another example, assuming that the enforcement policy information is set to "sendLatest", when an entity that receives the notification message is in a connectionless state, a most recent message that is received during connectionless time duration may be stored and the previous message may be deleted according to a "sendLatest" operation, and a most recent message that is stored after a connection is recovered may be transmitted to a next entity.

As another example, when notification policy information (e.g., pendingNotification attribute) and separate attribute information (e.g., reconnectNotify or interimEventNotify attribute) are simultaneously configured, enforcement policy information included in the notification message may be configured to correspond to one of the notification policy information or the separate attribute information according to configuration of a subscriber or a predetermined rule.

sendNone, sendLatest, sendAllPending, and sendManual are non-limiting examples, and the names of values of the enforcement policy information may be changed. For example, the value of the enforcement policy information may be set to "none" instead of sendNone, "latest" instead of sendLatest, "all" instead of sendAllPending, and "manual" instead of sendManual. An entity (e.g., transit entity or receiver) that receives the notification message may perform an operation associated with buffering of the notification message according to a value of the enforcement policy information in the notification message.

As another example of the present invention, the enforcement policy information may be included in the notification message as reference information. In this case, the notification message may include address information (e.g., URI) indicating the notification policy information (e.g., pendingNotification attribute) or the separate attribute information (e.g., reconnectNotify or interimEventNotify attribute) as the enforcement policy information. In this case, an entity (e.g., transit entity or receiver) that receives the notification message may perform an operation associated with buffering of the notification message by retrieving or referring to the notification policy information (e.g., pendingNotification attribute) or the separate attribute information (e.g., reconnectNotify or interimEventNotify attribute) using the address information (e.g., URI) included in the notification message.

When the transit entity performs an operation according to the present invention, the transit entity may check subscription resource reference information (e.g., subscription reference) included in the notification message and perform a buffering related operation on a notification message having the same subscription resource reference information according to the enforcement policy information. The subscription resource reference information may refer to address information (e.g., URI) indicating the subscription resource. For example, the transit entity is connectionless and thus, may receive a plurality of notification messages from the originator and buffer the notification messages. However, even notification messages that are received from the same originator may be generated by different subscription resources. In this case, address information (e.g., URI) of the subscription resource that generates the notification message may be included in the corresponding notification message. Accordingly, the transit entity may check whether the notification messages are generated by the same subscription resource using the subscription resource reference information (or the subscription resource address information) included in the notification message. In this case, since the same notification policy information is set for the same subscription resource, the same buffering related operation may be performed on a notification message with the same subscription resource reference information (or subscription resource address information).

For example, a plurality of subscription resources may be configured for the originator, notification policy information of a first subscription resource may be set to sendNone, and notification policy information of a second subscription resource may be set to sendLatest. In this case, according to the present invention, the notification message generated by each subscription resource may include enforcement policy information corresponding to the corresponding notification policy information. For example, the enforcement policy information of the first subscription resource may have a value corresponding to sendNone or include address information (e.g., URI) of the notification policy information of the first subscription resource. Similarly, for example, the enforcement policy information of the second subscription resource may have a corresponding to sendLatest or include address information (e.g., URI) of the notification policy information of the second subscription resource. The transit entity may perform a buffering related operation corresponding to sendNone by discarding all notification messages including the address information of the first subscription resource as subscription resource reference information according to the enforcement policy information included in the notification messages. In addition, the transit entity may perform a buffering related operation corresponding to sendLatest by storing a most recently received notification message among the notification messages including the address information of the second subscription resource and discarding a previously stored notification message.

Figure 20:
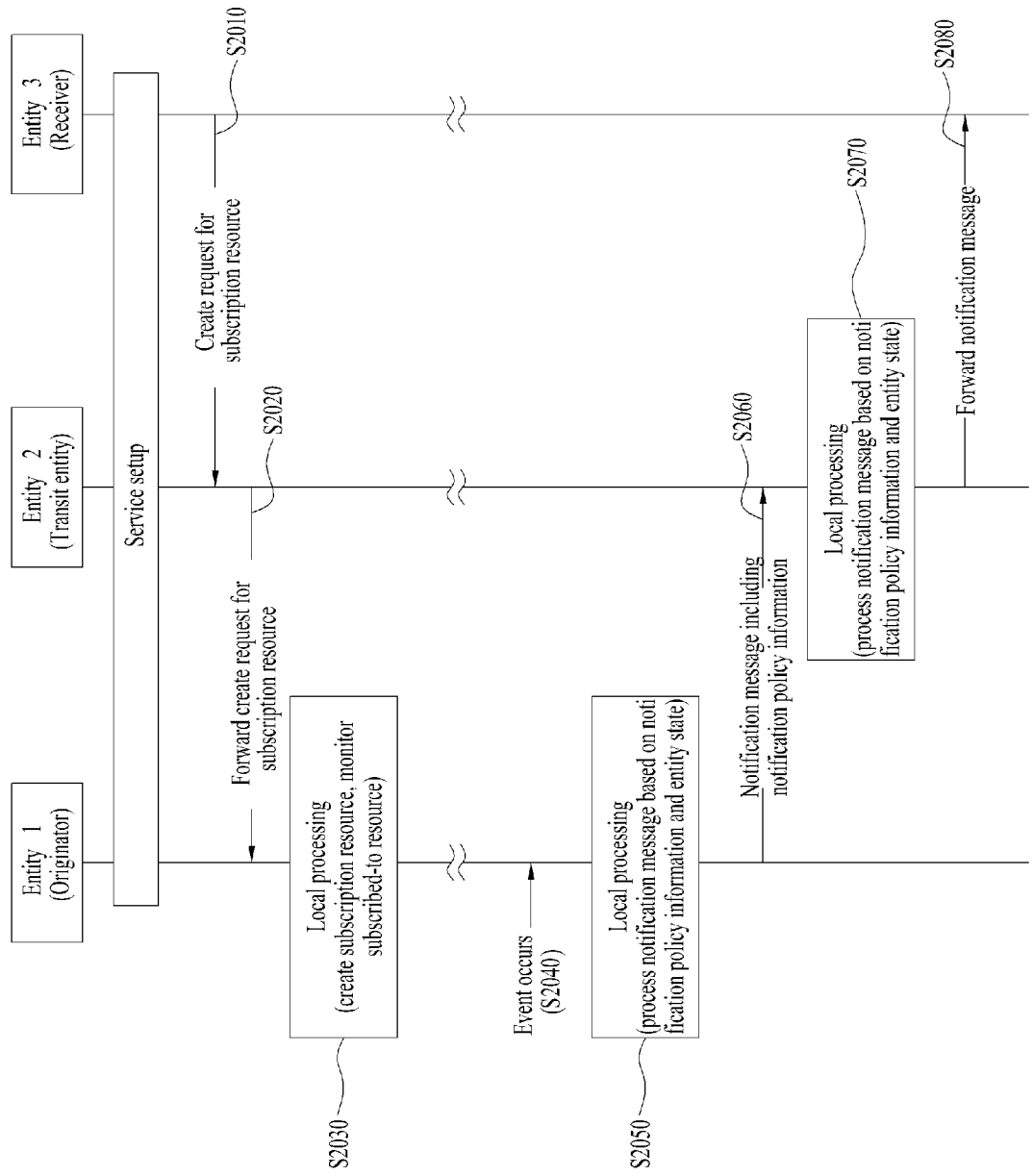
FIG. 20 illustrates a notification message transmitting procedure according to the present invention.

FIG. 20 illustrates a notification message transmitting procedure according to the present invention.

Referring to FIG. 20, it is assumed that entities perform a preparation procedure for a service and successfully perform setup for the service. In addition, although a description is given on the assumption that a receiver and a subscriber are the same, the present invention may be applied to the case in which the receiver and the subscriber are different. In the specification, buffering related attribute information may have an equivalent meaning with attribute information for management of buffering.

In operation S2010, the receiver (e.g., entity 3) may transmit a request message for performing a subscription procedure for a specific resource (subscribed-to resource) of the originator (e.g., entity 1) to the transit entity (e.g., entity 2). In this case, the request message may include attribute information (e.g., notification policy information) for managing items associated with buffering of the notification message together with attribute information configured in the conventional subscription procedure.

As described above, the attribute information items for managing items associated with buffering may include related attribute information items set in order to overcome issues such as ① hardware specification of an entity itself, ② delay due to a network state, ③ entity scheduling set by a specific user, ④ data that is irregularly transmitted from various entities, and ⑤ disconnection of connection between entities.

Each of the attribute information items (e.g., enforcement policy information) for managing the items associated with buffering may be set to one value (or operating level) of ① sendNone, ② sendLatest, ③ sendAllPending, and ④ sendManual, as described above.

In operation S2020, the transit entity (e.g., entity 2) may transmit the request message received from the receiver (e.g., entity 3) to the originator (e.g., entity 1).

In operation S2030, the originator (e.g., entity 1) may create a subscription resource (e.g., <subscription> resource) as a lower resource of a specific resource (e.g., subscribed-to resource) based on the request message received from the receiver (e.g., entity 3). Then, the specific resource (subscribed-to resource) requested by the subscription resource may be monitored.

In operation S2040, an event triggered by the subscription resource may occur (e.g., the subscribed-to resource may be changed and the originator may detect the change). In this case, the originator (e.g., entity 1) may perform a procedure for processing the notification message.

In operation S2050, the originator (e.g., entity 1) may check whether buffering related attribute information items are configured by a subscriber (e.g., entity 3) in order to transmit a notification message to a next entity. In this case, the buffering related attribute information items may refer to attribute information items (e.g., attribute information items for overcoming the issues (①  to ③) described in relation to operation 2010) for enforcing buffering related policies of the originator and the transit entity between the originator and the receiver. In more detail, the buffering related attribute information items may refer to, for example, notification policy information (e.g., pendingNotification attribute) or separate attribute information (e.g., reconnectNotify or interimEventNotify attribute).

In operation S2050, when the buffering related attribute information items are configured, the originator (e.g., entity 1) may process the notification message according to an operating level of each attribute. For example, when the originator (e.g., entity 1) is connectionless, the notification message may be processed according to the notification policy information (e.g., pendingNotification attribute). In this case, the processed notification message may be configured according to one operating level configured by a subscriber among sendNone, sendLatest, sendAllPending, and sendManual, as described above.

In operation S2060, the originator (e.g., entity 1) may transmit the processed notification message to a next entity (e.g., entity 2 or transit entity). In this case, the notification message that is transmitted to a next entity may include buffering related attribute information items. For example, the notification message transmitted to a next entity may include enforcement policy information corresponding to notification policy information (e.g., pendingNotification attribute) or separate attribute information (e.g., reconnectNotify or interimEventNotify attribute). In addition, for example, the enforcement policy information may have a value corresponding to a value of the notification policy information (e.g., pendingNotification attribute) or the separate attribute information (e.g., reconnectNotify or interimEventNotify attribute) and may be enforcement information associated with a notification policy. As another example, the enforcement policy information may include reference information or address information of the notification policy information (e.g., pendingNotification attribute) or the separate attribute information (e.g., reconnectNotify or interimEventNotify attribute). When attribute information items are transmitted as reference information or address information, an entity that receives the notification message may perform an additional operation (e.g., retrieval operation) in order to check policy information for buffering. In addition, for example, the notification message transmitted to a next entity may include reference information or address information of the subscription resource that generated the notification message.

Operation S2060 may be applied to all procedures for transmitting the notification message to a next entity. For example, operation S2060 may be performed between ① an originator and a receiver, ② an originator and a transit entity, ③ a transit entity and transit entity, and ④ a transit entity and a receiver.

In operation S2070, the transit entity (e.g., entity 2) may process the notification message using a state of the transit entity, the received notification message, and the buffering related attribute information (e.g., enforcement policy information). In this case, a procedure for processing the notification message may be performed in consideration of a connection state of the transit entity (e.g., entity 2) in the same/similar way as operation S2050. For example, when the transit entity (e.g., entity 2) is in a connectionless state, the transit entity (e.g., entity 2) may receive the notification message and perform a buffering related operation according to the enforcement policy information. For example, when the transit entity (e.g., entity 2) is in a connectionless state and the enforcement policy information of the notification message is set to sendLatest, the transit entity (e.g., entity 2) may store a most recently received notification message according to the enforcement policy information and discard a previously stored notification message. In addition, for example, when the transit entity (e.g., entity 2) is in a connectionless state and the enforcement policy information of the notification message is set to sendNone, the transit entity (e.g., entity 2) may discard all messages that are received according to the enforcement policy information. In addition, for example, when the transit entity (e.g., entity 2) is in a connectionless state and the enforcement policy information of the notification message is set to sendAllPending, the transit entity (e.g., entity 2) may store all messages received according to the enforcement policy information and transmit the message to a next entity after a connection is recovered.

In addition, while the notification message is processed, the subscription resource reference information included in the notification message may be checked and the enforcement policy information may be applied to a notification message having the same subscription resource reference information. For example, when enforcement policy information of a specific notification message is set to any one of sendNone, sendLatest, sendAllPending, and sendManual, the corresponding enforcement policy information may be applied to the notification message having the same subscription resource reference information as subscription resource reference information included in the specific message.

In operation S2080, the transit entity (e.g., entity 2) may transmit the notification message processed in operation S2070 to the receiver (e.g., entity 3). In this case, the processed notification message may be transmitted with reference to address information (e.g., information configured at to) indicating a receiver (or a subscriber), which is included in the notification message. After a connection is recovered, the transit entity (e.g., entity 2) may transmit notification messages buffered according to enforcement policy information in operation S2070 to a next entity (e.g., entity 3). In this case, the transmitted notification message may include buffering related attribute information items (e.g., enforcement policy information) as well as message contents.

Like in operation S2060, in operation S2080, the buffering related attribute information items may be transmitted directly or in the form of reference information.

In operation S2080, when the next entity that will receive the notification message is a last destination (i.e., receiver), the notification message may include ① all buffering related attributes as well as the processed notification message contents or ② only a processed notification message according to configuration. When the next entity that will receive the notification message is a transit entity, the notification message may include all buffering related attribute information items together with the processed notification message contents.

The example illustrated in FIG. 20 may be reduced or enlarged according to configuration of an entity. Operations S2010 to S2080 may be applied to, for example, three entities (originator, transit entity, and receiver) as a target. When only two entities (originator and receiver) are present, the method shown in FIG. 20 may include operations S2010 to S2060. When four or more entities (originator, transit entity 1, transit entity 2, and receiver) are present, the method shown in FIG. 20 may be performed by performing operations up to operation S2080 and then further performing operations S2070 and S2080 according to the number of transit entities.

Figure 21:
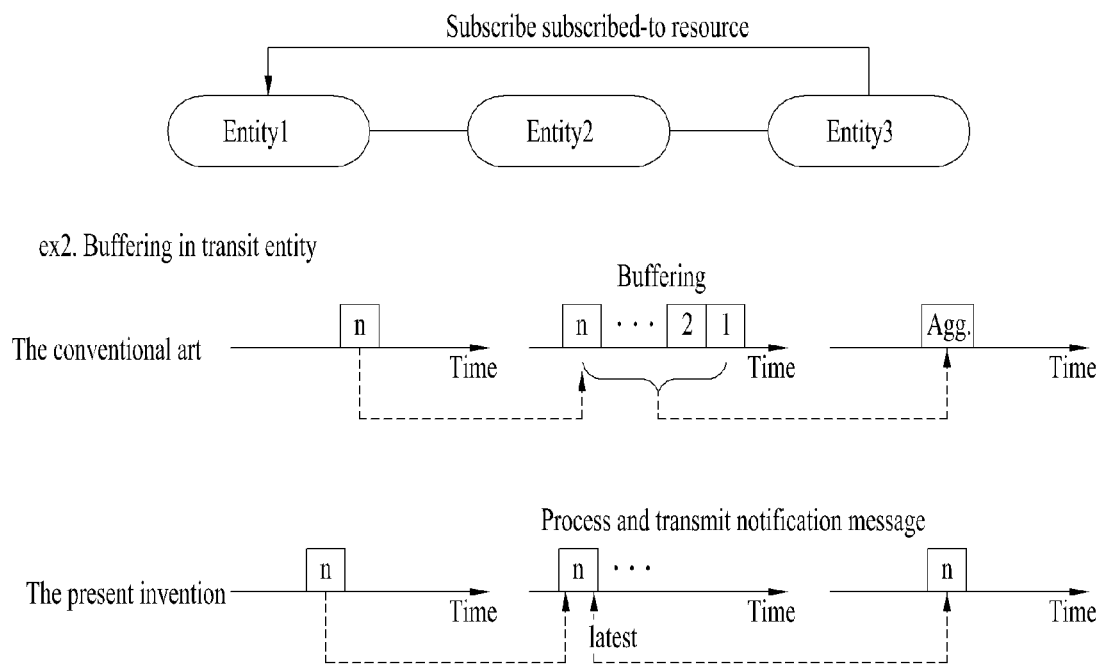
FIG. 21 and FIG. 22 illustrate embodiments of the present invention.

FIG. 21 illustrates an embodiment of the present invention. In the example of FIG. 21, for convenience of description, it is assumed that the enforcement policy information is set to a value corresponding to "sendLatest".

Referring to FIG. 21, notification messages may be buffered in a transit entity (e.g., entity 2). When the conventional art is applied, there is not buffering related attribute information (e.g., notification policy information or separate attribute information) set for the transit entity, and thus an issue may occur in that all the messages buffered in the transit entity are transmitted to a next entity (e.g., entity 3). However, when the method according to the present invention is applied, the transit entity transmits only a most recently generated notification message ("n") among notification messages ("1", "2", . . . , "n") that are buffered according to attribute information (e.g., "sendLatest") configured by a subscriber, and thus the receiver may receive only a desired notification message.

Figure 22:
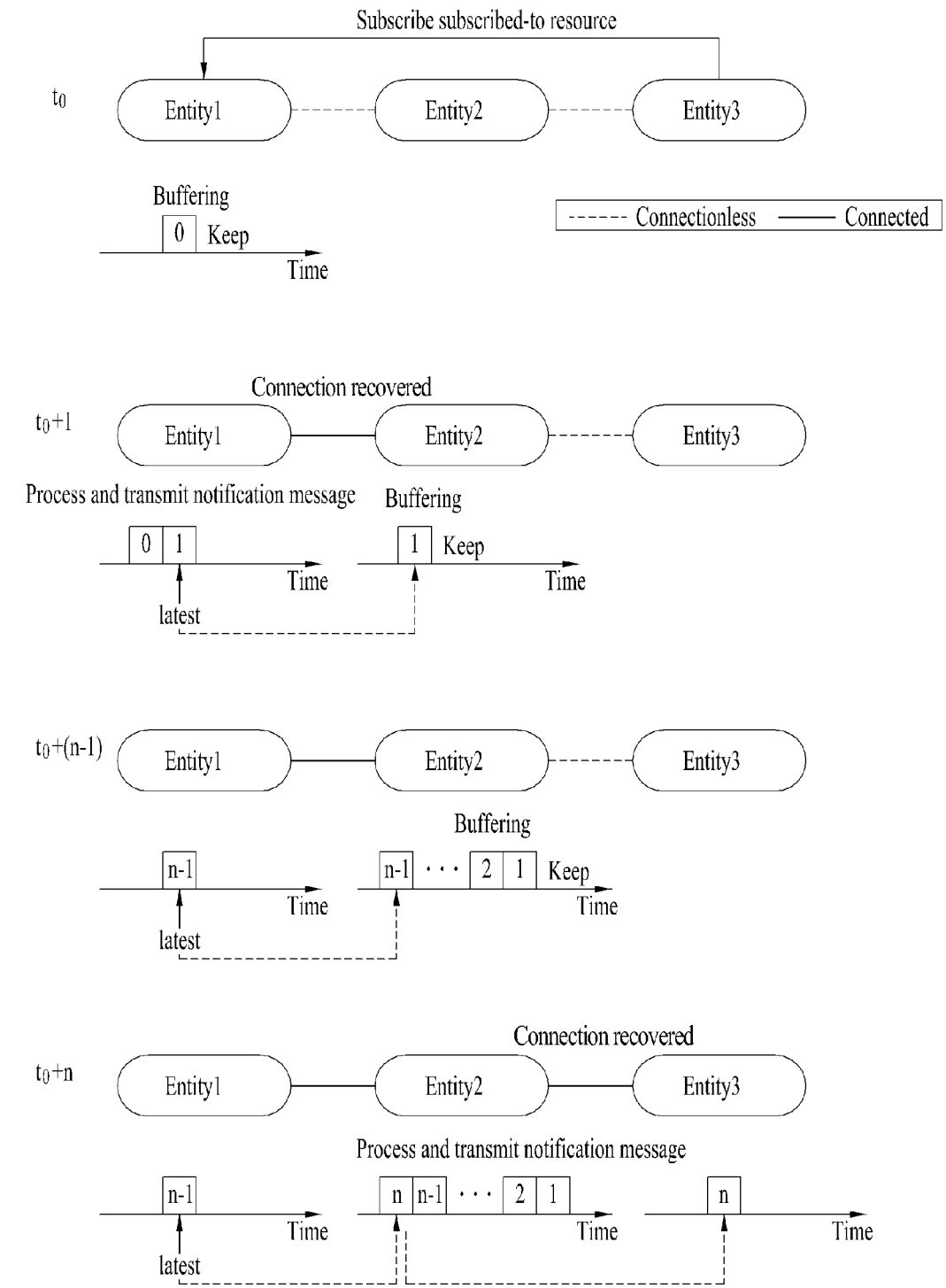

FIG. 22 illustrates another embodiment of the present invention. In the example of FIG. 22, the buffering related attribute information and notification messages may be complexly buffered in the originator and the transit entity. For convenience of description, it is assumed that the buffering related attribute information set by the subscriber may be set to "sendLatest". In the example of FIG. 22, the buffering related attribute information may include notification policy information (e.g., pendingNotification attribute) or separate attribute information (e.g., reconnectNotify or interimEventNotify attribute). In addition, it is assumed that a new event occur at each time ($t_0, t_1, \ldots, t_n$) and there is no transmission delay between entities.

(1) $t_0$: first, an originator is connectionless with a transit entity (e.g., entity 2) at $t_0$, and thus the originator cannot transmit a generated notification message and may instead keep the notification message (e.g., "0").

(2) $t_0+1$: at time ($t_0+1$) after predetermined time elapses, connection between the originator (e.g., entity 1) and the transit entity (e.g., entity 2) may be recovered. Even if notification messages (i.e., "0" and "1") can be buffered, the originator (e.g., entity 1) may process a notification message according to an operating level ("sendLatest") configured by a subscriber. The processed notification message may include only a most recently generated notification message (i.e., "1") and may be transmitted to the transit entity (e.g., entity 2). In this case, the originator (e.g., entity 1) may transmit together information (e.g., enforcement policy information) corresponding to attribute information requested by the subscriber as well as the notification message to the transit entity (e.g., entity 2).

(3) $t_0+(n-1)$: up to time $t_0+(n-1)$, a connection of the transit entity (e.g., entity 2) with the receiver (e.g., entity 3) is disconnected, and thus notification messages (e.g., "1", "2", . . . , "n-1") may be buffered in the transit entity (e.g., entity 2).

(4) $t_0+n$: when a connection between the transit entity (e.g., entity 2) and the receiver (e.g., entity 3) is recovered, the transit entity (e.g., entity 2) may process a notification message (e.g., "1", "2", . . . , "n-1", "n") buffered in the transit entity using enforcement policy information transmitted from the originator (e.g., entity 1). The processed notification message may include only a most recently generated notification message ("n") and may be transmitted to the receiver (e.g., entity 3).

Figure 23:
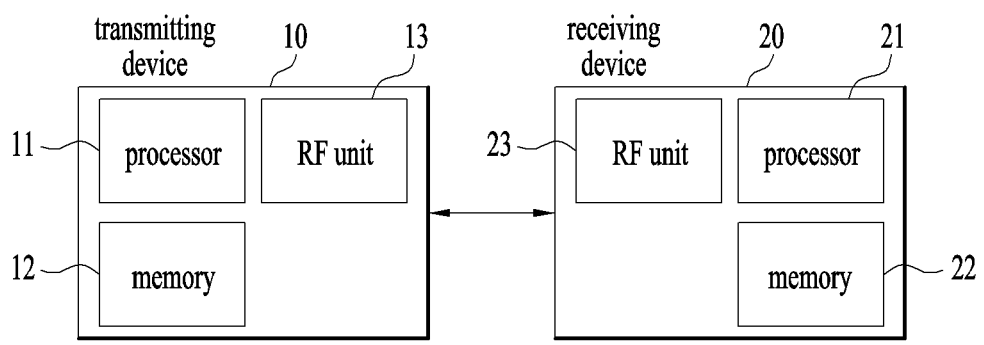
FIG. 23 illustrates a block diagram of a device to which the present invention is applicable.

FIG. 23 illustrates a block diagram of a device according to embodiment(s) of the present invention. In the present invention, each of M2M gateway, M2M server, or M2M device may operate as a transmitting device 10 or a receiving device 20.

The transmitting device 10 and the receiving device 20 respectively include radio frequency (RF) units 13, 23 for transmitting and receiving radio signals carrying information, data, signals, and/or messages, memories 12, 22 for storing information related to communication in a wireless communication system, and processors 11, 21 operatively connected to the RF units 13, 23 and the memories 12, 22 and configured to control the memories 12, 22 and/or the RF units 13, 23 so as to perform at least one of the above-described embodiments of the present invention.

The memories 12, 22 may store programs for processing and control of the processors 11, 21 and may temporarily storing input/output information. The memories 12, 22 may be used as buffers.

The processors 11, 21 control the overall operation of various modules in the transmitting device 10 or the receiving device 20. The processors 11, 21 may perform various control functions to implement the present invention. The processors 11, 21 may be controllers, microcontrollers, microprocessors, or microcomputers. The processors 11, 21 may be implemented by hardware, firmware, software, or a combination thereof. In a hardware configuration, Application Specific Integrated Circuits (ASICs), Digital Signal Processors (DSPs), Digital Signal Processing Devices (DSPDs), Programmable Logic Devices (PLDs), or Field Programmable Gate Arrays (FPGAs) may be included in the processors 11, 21. If the present invention is implemented using firmware or software, firmware or software may be configured to include modules, procedures, functions, etc. performing the functions or operations of the present invention. Firmware or software configured to perform the present invention may be included in the processors 11, 21 or stored in the memories 12, 22 so as to be driven by the processors 11, 21.

The processor 11 of the transmitting device 10 is scheduled from the processor 11 or a scheduler connected to the processor 11 and codes and modulates signals and/or data to be transmitted to the outside. The coded and modulated signals and/or data are transmitted to the RF unit 13. A signal processing process of the receiving device 20 is the reverse of the signal processing process of the transmitting device 10. Under the control of the processor 21, the RF unit 23 of the receiving device 10 receives RF signals transmitted by the transmitting device 10. The processor 21 decodes and demodulates the radio signals received through the receive antennas and restores data that the transmitting device 10 wishes to transmit.

The RF units 13, 23 include one or more antennas. An antenna performs a function of transmitting signals processed by the RF units 13, 23 to the exterior or receiving radio signals from the exterior to transfer the radio signals to the RF units 13, 23. FIG. 23 illustrates that the transmitting device and the receiving device communicate through RF units respectively, but the present invention is not limited thereto. In the present invention, the transmitting device and the receiving device may communicate through a wired network. In this case, the RF unit may be replaced with a network interface unit (NIU).

The embodiments of the present invention described above are combinations of elements and features of the present invention. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions of any one embodiment may be included in another embodiment and may be replaced with corresponding constructions of another embodiment. It is obvious to those skilled in the art that claims that are not explicitly cited in each other in the appended claims may be presented in combination as an embodiment of the present invention or included as a new claim by a subsequent amendment after the application is filed.

Specific operations to be conducted by the base station in the present invention may also be conducted by an upper node of the base station as necessary. In other words, it will be obvious to those skilled in the art that various operations for enabling the base station to communicate with the terminal in a network composed of several network nodes including the base station will be conducted by the base station or other network nodes other than the base station. The base station may be referred to as a fixed station, a node-B (NB), an evolved node-B (eNB), an access point (AP), etc. A terminal may be referred to as a user equipment (UE), a mobile station (MS), a mobile subscriber station (MSS), etc.

The embodiments of the present invention may be implemented by various means, for example, hardware, firmware, software, or a combination thereof. In a hardware implementation, an embodiment of the present invention may be implemented by one or more application specific integrated circuits (ASICs), digital signal processors (DSPs), digital signal processing devices (DSDPs), programmable logic devices (PLDs), field programmable gate arrays (FPGAs), processors, controllers, microcontrollers, microprocessors, etc.

In a firmware or software implementation, an embodiment of the present invention may be implemented in the form of a module, a procedure, a function, etc. Software code may be stored in a memory unit and executed by a processor. The memory unit is located at the interior or exterior of the processor and may transmit and receive data to and from the processor via various known means.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

INDUSTRIAL APPLICABILITY

The present invention is applicable to a communication apparatus such as a terminal, a server, a gateway, etc.

The invention claimed is:

1. A method for transmitting a notification message by a machine-to-machine (M2M) device, the method comprising:
generating, by the M2M device, at least one notification message, based on detecting a change in a subscribed-to resource comprising a subscription resource, wherein the subscription resource includes attribute information indicating a notification policy for a connectionless period;
processing, by the M2M device, the generated at least one notification message according to the attribute information when there is no connectivity; and
transmitting, by the M2M device to another M2M device, the processed at least one notification message when connectivity is recovered,
wherein, based on the attribute information indicating that the notification policy is sending latest, only a latest, notification message from among the generated at least one notification message is transmitted, and
wherein the subscription resource and the subscribed-to resource indicate a uniquely addressable data structure using a unique address.

2. The method according to claim 1, wherein, based on the attribute information indicating that the notification policy is sending all, all the generated at least one notification message are transmitted.

3. The method according to claim 1, wherein:
the transmitted at least one notification message includes address information of the subscription resource and parameter information corresponding to the notification policy, and
based on the parameter information indicating latest, the another M2M device buffers only a latest notification message having the same address information of the subscription resource.

4. The method according to claim 3, wherein the parameter information is included in information indicating an event category within the at least one notification message.

5. A machine-to-machine (M2M) device, comprising;
a network interface unit; and
a processor operatively connected to the network interface unit, and configured to:
generate at least one notification message, based on detecting a change in a subscribed-to resource comprising a subscription resource, wherein the subscription resource includes attribute information indicating a notification policy for a connectionless period,
process the generated at least one notification message according to the attribute information when there is no connectivity, and
control the network interface unit to transmit, to another M2M device, the processed at least one notification message when connectivity is recovered,
wherein, based on the attribute information indicating that the notification policy is sending latest, only a latest notification message from among the generated at least one notification message is transmitted, and
wherein the subscription resource and the subscribed-to resource indicate a unique addressable data structure using a unique address.

6. The M2M device according to claim 5, wherein, based on the attribute information indicating that the notification policy is sending all, all the generated at least one notification message are transmitted.

7. The M2M device according to claim 5, wherein:
the transmitted at least one notification message includes address information of the subscription resource and parameter information corresponding to the notification policy, and
based on the parameter information indicating latest, the another M2M device buffers only a latest notification message having the same address information of the subscription resource.

8. The M2M device according to claim 7, wherein the parameter information is included in information indicating an event category within the at least one notification message.

9. The method according to claim 1, wherein, based on the attribute information indicating that the notification policy is sending none, all the generated at least one notification message are discarded.

10. The M2M device according to claim 5, wherein, based on the attribute information indicating that the notification policy is sending none, all the generated at least one notification message are discarded.

11. A method for transmitting a notification message by a machine-to-machine (M2M) device, the method comprising:
- receiving, by the M2M device from an originator device, at least one notification message, wherein the at least one notification message includes parameter information corresponding to a notification policy for a connectionless period;
- processing, by the M2M device, the received at least one notification message according to the parameter information when there is no connectivity; and
- transmitting, by the M2M device to another M2M device, the processed at least one notification message when connectivity is recovered,
- wherein, based on the parameter information indicating latest, only a latest notification message from among the received at least one notification message is transmitted, and
- wherein the subscription resource and the subscribed-to resource indicate a uniquely addressable data structure using a unique address.

12. The method according to claim 11, wherein the received at least one notification message includes address information of the subscription resource, and
- wherein the latest notification message is identified from among messages having the same address information of the subscription resource.

13. The method according to claim 11, wherein the parameter information is included in information indicating an event category within the at least one notification message.

14. The method according to claim 11, wherein the at least one notification message is generated by the originator device, based on detecting a change in a subscribed-to resource comprising, a subscription resource, wherein the subscription resource is configured as a child resource of the subscribed-to resource.

15. A machine-to-machine (M2M) device, comprising:
- a network interface unit; and
- a processor operatively connected to the network interface unit and configured to:
  - receive, from an originator device, at least one notification message, wherein the at least one notification message includes parameter information corresponding to a notification policy for a connectionless period,
  - process the received at least one notification message according to the parameter information when there is no connectivity, and
  - transmit, to another M2M device, the processed at least one notification message when connectivity is recovered,
- wherein, based on the parameter information indicating latest, only a latest notification message from among the received at least one notification message is transmitted, and
- wherein the subscription resource and the subscribed-to resource indicate a uniquely addressable data structure using a unique address.

16. The M2M device according to claim 15, wherein the received at least one notification message includes address information of the subscription resource, and
- wherein the latest notification message is identified from among messages having the same address information of the subscription resource.

17. The M2M device according to claim 15, wherein the parameter information is included in information indicating an event category within the at least one notification message.

18. The M2M device according to claim 15, wherein the at least one notification message is generated by the originator device, based on detecting a change in a subscribed-to resource comprising a subscription resource, wherein the subscription resource is configured as a child resource of the subscribed-to resource.

* * * * *